US010787245B2

United States Patent
Duffy et al.

(10) Patent No.: US 10,787,245 B2
(45) Date of Patent: Sep. 29, 2020

(54) DISTRIBUTED COMPRESSOR FOR IMPROVED INTEGRATION AND PERFORMANCE OF AN ACTIVE FLUID FLOW CONTROL SYSTEM

(71) Applicant: The Boeing Company, Chicago, IL (US)

(72) Inventors: Michael J. Duffy, Prospect Park, PA (US); Rene Woszidlo, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1013 days.

(21) Appl. No.: 15/169,879

(22) Filed: Jun. 1, 2016

(65) Prior Publication Data

US 2017/0349268 A1 Dec. 7, 2017

(51) Int. Cl.
*B64C 21/04* (2006.01)
*B64C 21/08* (2006.01)
(Continued)

(52) U.S. Cl.
CPC .............. *B64C 21/04* (2013.01); *B62D 35/00* (2013.01); *B63B 1/32* (2013.01); *B63G 8/00* (2013.01);
(Continued)

(58) Field of Classification Search
CPC ......... B64C 21/02; B64C 21/04; B64C 21/06; B64C 21/08; B64C 2230/04
See application file for complete search history.

(56) References Cited

U.S. PATENT DOCUMENTS 2,973,922 A * 3/1961 MacAulay ............ B64C 23/005
244/15
3,085,740 A * 4/1963 Wagner ................... B64C 23/00
244/200
(Continued)

FOREIGN PATENT DOCUMENTS

DE 102009011662 A1 9/2010
EP 0222421 A1 5/1987
(Continued)

OTHER PUBLICATIONS

Extended European Search Report, dated Aug. 2, 2017, regarding Application No. 17172205.1, 9 pages.
(Continued)

*Primary Examiner* — Philip J Bonzell
*Assistant Examiner* — Michael B. Kreiner
(74) *Attorney, Agent, or Firm* — Yee & Associates, P.C.

(57) ABSTRACT

A method and apparatus for controlling an airflow. The method draws air through a group of inlets. The group of inlets is located in a group of locations on the vehicle such that the group of inlets actively controls the airflow relative to an aircraft when drawing the air. The method compresses the air drawn by the group of inlets in a group of air compressor units located in an aircraft structure to form pressurized air. Further, the method sends the pressurized air through a group of exit ports in the aircraft structure. The pressurized air flowing out of the group of exit ports actively controls the airflow for an aircraft, enabling an improved performance of the aircraft.

23 Claims, 15 Drawing Sheets

(51) Int. Cl.
*B64C 21/06* (2006.01)
*B62D 35/00* (2006.01)
*B63B 1/32* (2006.01)
*B63G 8/00* (2006.01)
*B64C 5/02* (2006.01)
*B64C 9/14* (2006.01)
*B64C 9/00* (2006.01)

(52) U.S. Cl.
CPC .......... *B64C 5/02* (2013.01); *B64C 9/14* (2013.01); *B64C 21/06* (2013.01); *B64C 21/08* (2013.01); *B60Y 2200/11* (2013.01); *B60Y 2200/114* (2013.01); *B60Y 2200/14* (2013.01); *B60Y 2200/143* (2013.01); *B60Y 2200/30* (2013.01); *B60Y 2200/50* (2013.01); *B64C 2009/005* (2013.01); *B64C 2230/04* (2013.01); *B64C 2230/06* (2013.01); *Y02T 50/166* (2013.01)

(56) References Cited

U.S. PATENT DOCUMENTS

| | | | | |
|---|---|---|---|---|
| 3,253,808 A * | 5/1966 | La Fave | | B64C 23/00 244/207 |
| 3,669,386 A * | 6/1972 | Jacobs | | B64C 9/38 244/207 |
| 4,099,691 A * | 7/1978 | Swanson | | B64C 21/04 244/134 B |
| 5,114,100 A * | 5/1992 | Rudolph | | B64C 21/06 244/130 |
| 5,114,103 A * | 5/1992 | Coffinberry | | B64C 21/06 244/209 |
| 5,899,416 A * | 5/1999 | Meister | | B64C 21/06 244/207 |
| 6,109,565 A | 8/2000 | King | | |
| 6,308,898 B1 | 10/2001 | Dorris, III et al. | | |
| 6,375,118 B1 | 4/2002 | Kibens et al. | | |
| 6,713,901 B2 | 3/2004 | Hassan et al. | | |
| 6,763,651 B2 | 7/2004 | Shmilovich et al. | | |
| 6,899,302 B1 | 3/2005 | Hassan et al. | | |
| 7,255,309 B2 | 8/2007 | Boldrin et al. | | |
| 7,737,608 B2 | 6/2010 | Ruggeri et al. | | |
| 7,980,516 B2 | 7/2011 | Birchette | | |
| 8,016,245 B2 | 9/2011 | Hassan et al. | | |
| 8,016,246 B2 | 9/2011 | Schwimley et al. | | |
| 8,128,036 B2 | 3/2012 | Boldrin et al. | | |
| 8,162,255 B2 | 4/2012 | Weaver et al. | | |
| 8,382,043 B1 * | 2/2013 | Raghu | | B64C 21/04 244/1 N |
| 8,690,106 B1 * | 4/2014 | Reissig | | B64C 21/025 244/208 |
| 8,714,945 B2 | 5/2014 | Birchette | | |
| 8,827,212 B1 * | 9/2014 | Shmilovich | | B64C 21/08 244/207 |
| 8,849,603 B2 | 9/2014 | Boldrin et al. | | |
| 8,887,482 B1 | 11/2014 | Ruggeri et al. | | |
| 9,027,702 B2 | 5/2015 | Griffin | | |
| 9,090,326 B2 * | 7/2015 | Whalen | | B64C 5/06 |
| 9,090,340 B2 * | 7/2015 | Golling | | B64C 9/18 |
| 9,108,725 B1 * | 8/2015 | Shmilovich | | B64C 21/04 |
| 9,120,563 B2 * | 9/2015 | Raghu | | F15B 21/12 |
| 9,333,517 B2 * | 5/2016 | Koklu | | B05B 1/08 |
| 9,339,825 B2 * | 5/2016 | Koklu | | B05B 1/08 |
| 9,346,536 B2 * | 5/2016 | Raghu | | B64C 21/04 |
| 9,404,339 B2 * | 8/2016 | Dykstra | | E21B 34/06 |
| 9,573,679 B2 * | 2/2017 | Golling | | B64C 21/04 |
| 10,086,927 B2 * | 10/2018 | Shmilovich | | F15C 1/00 |
| 10,358,208 B2 * | 7/2019 | Lin | | B64C 3/50 |
| 2006/0102801 A1 | 5/2006 | Manley | | |
| 2006/0202592 A1 | 9/2006 | Ruggeri et al. | | |
| 2008/0121295 A1 * | 5/2008 | Tippetts | | B05B 1/08 137/624.27 |
| 2008/0149205 A1 * | 6/2008 | Gupta | | B64C 21/04 137/829 |
| 2008/0173766 A1 | 7/2008 | Manley | | |
| 2009/0084906 A1 | 4/2009 | Hassan et al. | | |
| 2010/0131238 A1 | 5/2010 | Boldrin et al. | | |
| 2011/0177748 A1 | 7/2011 | Luo | | |
| 2011/0280740 A1 | 11/2011 | Birchette | | |
| 2015/0101886 A1 | 4/2015 | Griffin | | |
| 2015/0104310 A1 | 4/2015 | Griffin | | |
| 2015/0308377 A1 | 10/2015 | Packard et al. | | |
| 2016/0013395 A1 | 1/2016 | Whelan et al. | | |
| 2016/0084165 A1 | 3/2016 | Packard et al. | | |
| 2016/0091112 A1 | 3/2016 | Gibbs | | |
| 2016/0107203 A1 | 4/2016 | Nikic | | |
| 2017/0036709 A1 * | 2/2017 | Metka | | B62D 35/001 |
| 2017/0152024 A1 * | 6/2017 | Colmagro | | B64C 3/28 |
| 2017/0174325 A1 * | 6/2017 | Bauer | | B64C 21/02 |
| 2017/0313412 A1 * | 11/2017 | Colmagro | | B64C 21/04 |
| 2018/0265208 A1 * | 9/2018 | Yousef | | B64C 21/06 |
| 2018/0370617 A1 * | 12/2018 | Raghu | | B64C 21/04 |

FOREIGN PATENT DOCUMENTS

| | | |
|---|---|---|
| EP | 2441669 A3 | 5/2014 |
| WO | WO2011110327 A2 | 9/2011 |
| WO | WO2015097164 A1 | 7/2015 |

OTHER PUBLICATIONS

Ahmed et al., "Computational Study of Flow Around a NACA 0012 Wing Flapped at Different Flap Angles with Varying Mach Numbers," Global Journal of Researches in Engineering—General Engineering, vol. 13, Issue 4, Version 1.0, 2013, pp. 4-16.

Extended European Search Report, dated Jul. 26, 2018, regarding Application No. EP17172205.1, 4 pages.

European Patent Office Communication Report, dated Apr. 1, 2019, regarding Application No. 17172205.1, 4 pages.

* cited by examiner

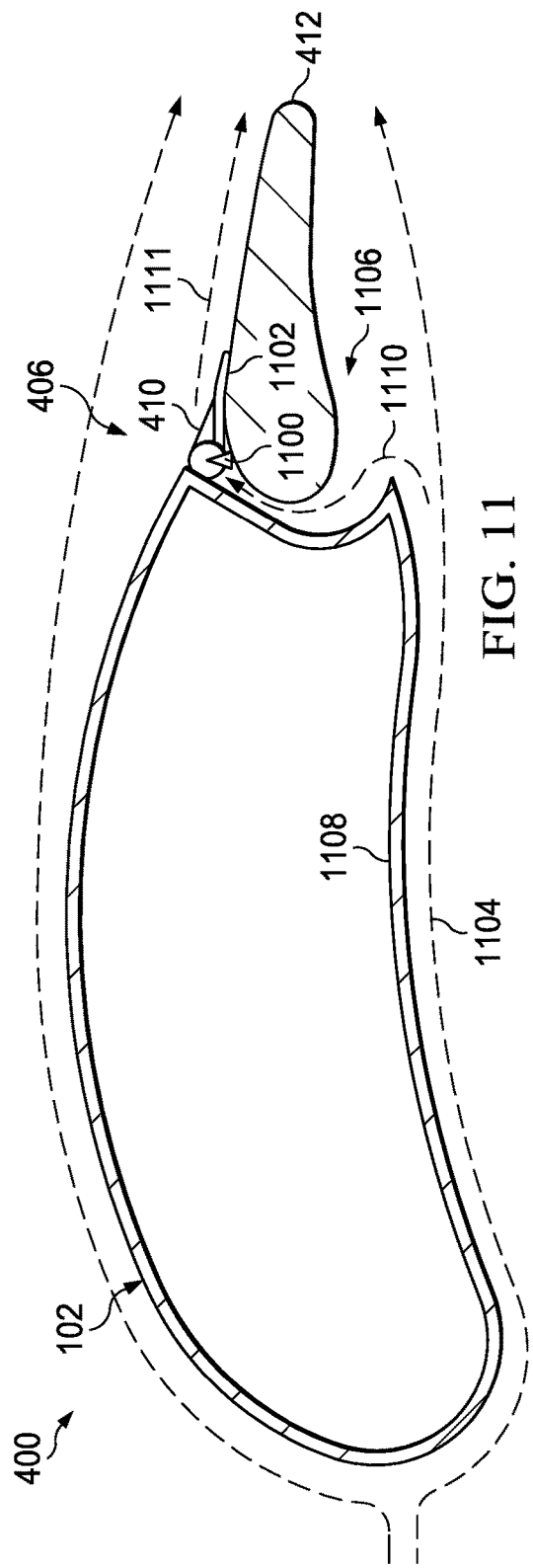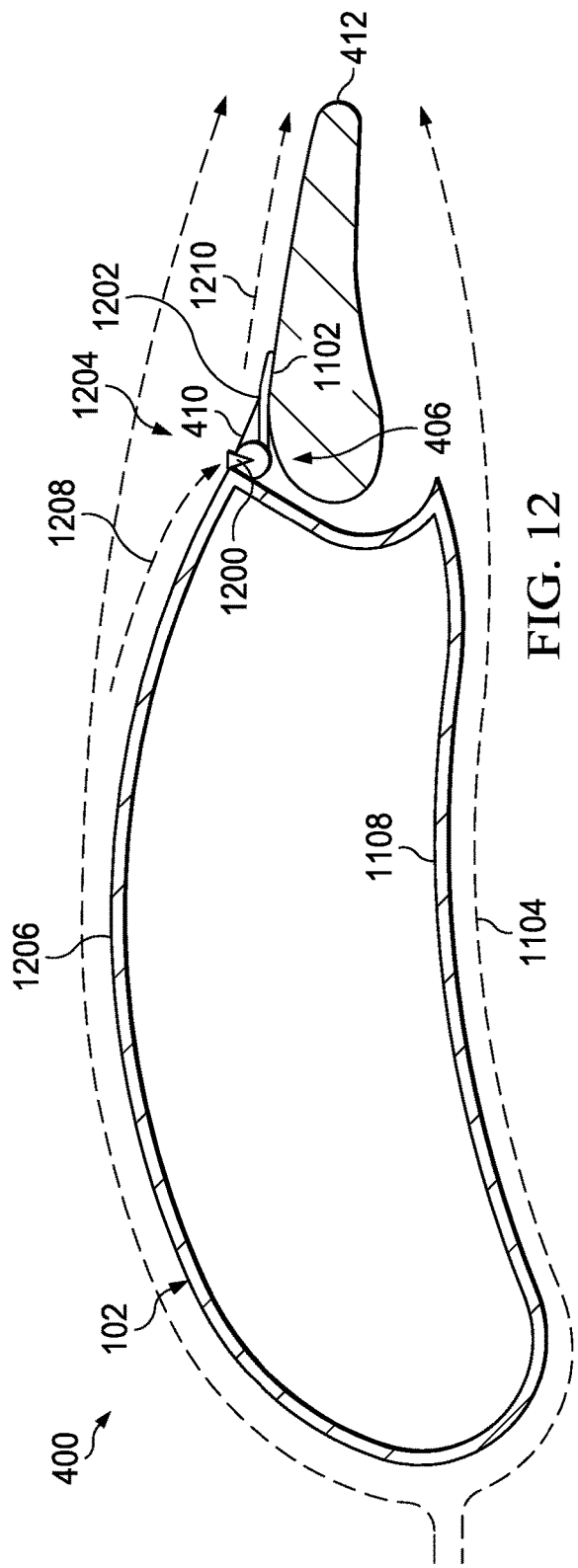

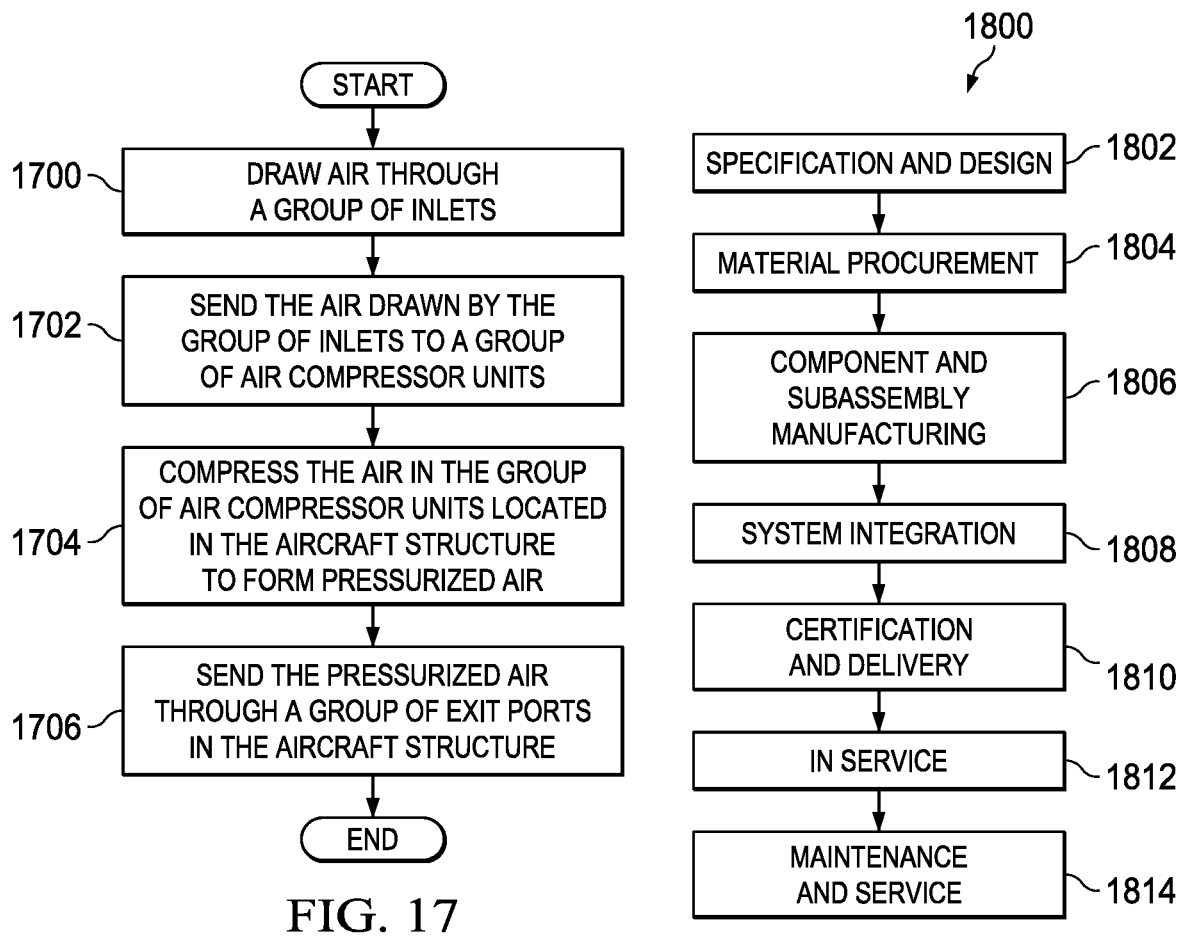
FIG. 17
FIG. 18
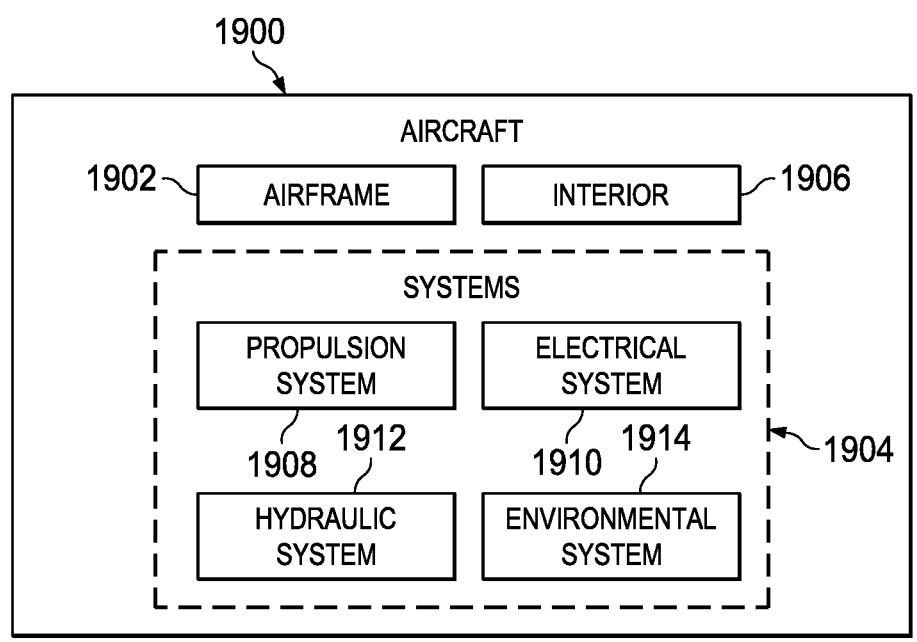
FIG. 19

DISTRIBUTED COMPRESSOR FOR IMPROVED INTEGRATION AND PERFORMANCE OF AN ACTIVE FLUID FLOW CONTROL SYSTEM

BACKGROUND INFORMATION

1. Field

The present disclosure relates generally to aircraft and, in particular, to controlling an operation of an aircraft. Still more particularly, the present disclosure relates to a method and apparatus for controlling airflow for the aircraft.

2. Background

A flow of air over surfaces of an aircraft affects aerodynamic forces and moments that act on the aircraft. The aerodynamic forces include lift and drag.

These aerodynamic forces affect the performance of the aircraft. For example, the manner in which air flows over a top surface and a bottom surface of a wing of the aircraft as the aircraft moves forward affects the lift that the wing generates.

As another example, a vertical takeoff and landing (VTOL) aircraft may use tiltrotors to takeoff and land. The tiltrotors also may be used by the vertical takeoff and landing aircraft to hover in addition to normal flight. The tiltrotors are rotating engine pods that are typically located at the end of the wings of the vertical takeoff and landing aircraft.

When the tiltrotors are angled such that a plane of rotation of the tiltrotors is horizontal, the air flows downward to provide lift for the vertical takeoff and landing aircraft. This flow of air also results in a downward force on the wings of the vertical takeoff and landing aircraft. This downward force is also referred to as a download.

Inefficiencies are present with this type of positioning of the tiltrotors. For example, the flow of air in the download results in a download that is greater than desired because of the manner in which the air flows around the wings of the vertical takeoff and landing aircraft during takeoff, landing, or hovering operations.

The download may be reduced by causing an attached flow through positioning the flap of the wing along with using an active airflow control applied to the flap. Currently used active airflow control systems, however, are more complex than desired.

For example, an auxiliary power unit and an air compressor may be located in a fuselage of the vertical takeoff and landing aircraft. The compressor includes high-pressure lines that lead to the exit ports in locations in the wings. Further, the air from the auxiliary power unit is often hotter than desired for use in the active airflow control system. As a result, a heat exchanger may be used to cool the air after compression and prior to routing to the exit ports. In addition to the complexity, this type of configuration adds to the weight of the vertical takeoff and landing aircraft.

This issue with currently used active airflow control systems is present with other aircraft in addition to the vertical takeoff and landing aircraft. For example, adding the active airflow control system to the vertical stabilizer of a commercial airplane may be desirable to enhance the forces generated for a desired yaw moment on the aircraft. However, issues with including components, such as an auxiliary exhibit power unit and an air compressor in the fuselage and running high-pressure lines to exit ports in the vertical stabilizer, lead to more complexity and result in more weight than desired.

Therefore, it would be desirable to have a method and apparatus that take into account at least some of the issues discussed above, as well as other possible issues. For example, it would be desirable to have a method and apparatus that overcome a technical problem with the complexity and weight of currently used active airflow control systems in aircraft.

SUMMARY

An embodiment of the present disclosure provides an apparatus that has a group of exit ports, a group of compressor units, and a group of inlets. The group of exit ports is in a structure for a vehicle and the group of compressor units is located in the structure. The group of compressor units is connected to the group of exit ports. Further, the group of compressor units increases a pressure of a fluid to form a pressurized fluid and sends the pressurized fluid through the group of exit ports. The pressurized fluid flowing out of the group of exit ports actively controls a fluid flow relative to the structure for the vehicle, enabling an improved performance of the vehicle. The group of inlets is connected to the group of air compressor units and supplies the air to the group of air compressor units, wherein the group of inlets is located in a group of locations on the vehicle such that the group of inlets actively controls the fluid flow relative to the vehicle when drawing the fluid, enabling an improved performance of the vehicle.

Another embodiment of the present disclosure provides an active airflow control system. The active airflow control system comprises a group of exit ports in an aircraft structure for an aircraft and a group of air compressor units in the aircraft structure. The group of air compressor units is connected to the group of exit ports. Further, the group of air compressor units increases a pressure of air to form a pressurized air and sends the pressurized air through the group of exit ports. The pressurized air flowing out of the group of exit ports actively controls an airflow relative to the aircraft structure for the aircraft, enabling an improved performance of the aircraft.

Yet another embodiment of the present disclosure provides a method for controlling an airflow. The method draws air through a group of inlets, wherein the group of inlets is located in a group of locations on a vehicle such that the group of inlets actively controls the airflow relative to an aircraft when drawing the air. Further, the method compresses the air drawn by the group of inlets in a group of air compressor units located in an aircraft structure to form pressurized air. Yet further, the method sends the pressurized air through a group of exit ports in the aircraft structure. The pressurized air flowing out of the group of exit ports actively controls the airflow for an aircraft, enabling an improved performance of the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 11 is an illustration of a cross-section of a wing with an active airflow control system in accordance with an illustrative embodiment;

FIG. 12 is another illustration of a cross-section of a wing with an active airflow control system in accordance with an illustrative embodiment;

FIG. 17 is an illustration of a flowchart of a process for controlling airflow in accordance with an illustrative embodiment;

FIG. 18 is an illustration of a block diagram of an aircraft manufacturing and service method in accordance with an illustrative embodiment; and FIG. 19 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that a centralized active airflow control system is more complex and adds more weight to an aircraft than is often desired. For example, the illustrative embodiments recognize and take into account that high-pressure lines may result in the more weight than desired. For example, running the high-pressure lines from an air compressor in a fuselage to a different aerodynamic structure, such as a wing, a horizontal stabilizer, a vertical stabilizer, or some other aerodynamic structure, may have lengths that add more weight than desired to the aircraft.

Further, the illustrative embodiments recognize and take into account that running the high-pressure lines from the air compressor in the fuselage to the exit ports in aerodynamic structures may be infeasible for refurbishment or reconfiguration of an existing aircraft. For example, the running high-pressure lines from the air compressor through the fuselage and the wing of an aircraft may be more complex and expensive than desired. Also, maintenance on these high-pressure lines is made more difficult than desired based on limited access that may be present for inspections and other maintenance.

The illustrative embodiments also recognize and take into account that some systems use bleed air from the engines of the aircraft. The use of the bleed air, however, may reduce the performance of the engines.

Additionally, the illustrative embodiments also recognize and take into account that the pressure of the air flowing through the exit ports may have different pressures with different lengths of the high-pressure lines used. As a result, the air flowing in the high-pressure lines through the exit ports may not have a desired pressure. To compensate, the exit ports may need to be designed individually to obtain a desired airflow. The diameters of the high-pressure lines may need to be varied to obtain a desired level of air pressure at the exit ports. These factors increase the complexity and expense of currently used active airflow control systems.

Thus, the illustrative embodiments provide a method and apparatus for controlling airflow. In one illustrative example, air is compressed in a group of air compressor units located in an aircraft structure to form pressurized air. The pressurized air is sent through a group of exit ports in the aircraft structure, wherein the pressurized air flowing out of the group of exit ports actively controls the airflow for the aircraft. The air that is compressed is supplied through a group of inlets. The group of inlets is located in a group of locations on the aircraft such that the group of inlets actively controls the airflow relative to the aircraft when drawing the air, enabling improved performance of the aircraft.

Figure 1:
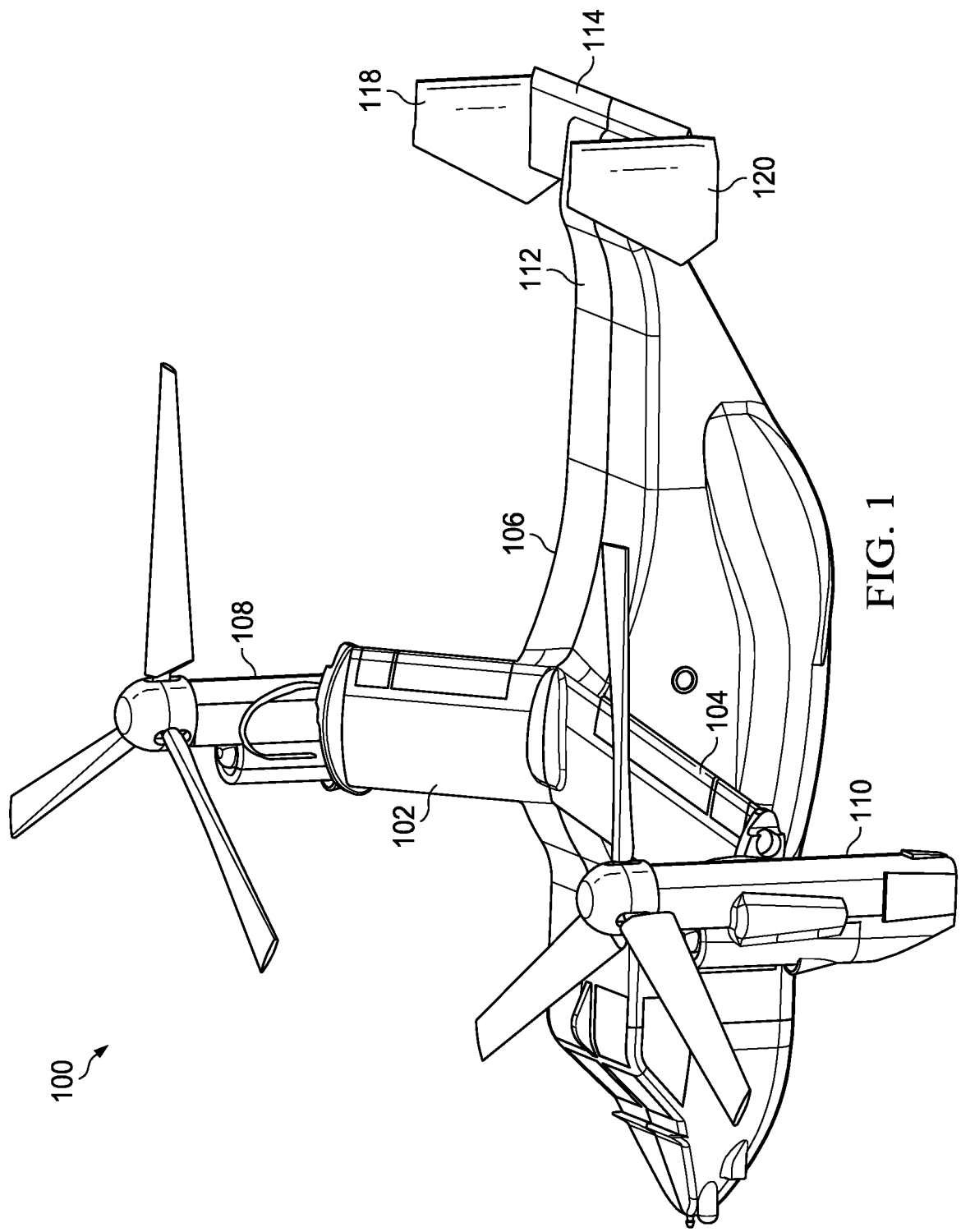
FIG. 1 is a pictorial illustration of a vertical takeoff and landing (VTOL) aircraft in accordance with an illustrative embodiment.

With reference now to the figures and, in particular, with reference to FIG. 1, a pictorial illustration of a vertical takeoff and landing (VTOL) aircraft is depicted in accordance with an illustrative embodiment. As depicted, vertical takeoff and landing aircraft 100 has wing 102 and wing 104 attached to fuselage 106. Vertical takeoff and landing aircraft 100 includes tilt rotor engine 108 attached to wing 102 and tilt rotor engine 110 attached to wing 104.

Fuselage 106 has tail section 112. Horizontal stabilizer 114, vertical stabilizer 118, and vertical stabilizer 120 are attached to tail section 112 of fuselage 106.

Vertical takeoff and landing aircraft 100 is an example of an aircraft in which an active airflow control system may be implemented in accordance with an illustrative embodiment. In this illustrative example, the active airflow control system is implemented in aircraft structures in vertical takeoff and landing aircraft 100, such as wing 102 and wing 104.

The active airflow control system may aid in different phases of flight of vertical takeoff and landing aircraft 100. For example, the active airflow control system may reduce the download on wing 102 and wing 104 caused by tilt rotor engine 108 and tilt rotor engine 110 during a vertical takeoff operation.

The illustration of vertical takeoff and landing aircraft 100 is only shown as one example of an aircraft in which an active airflow control system may be implemented. For example, the active airflow control system may be implemented in other types of aircraft, such as a direct thrust vertical takeoff and landing aircraft, a commercial airplane, a military airplane, or some other suitable type of aircraft.

Figure 2:
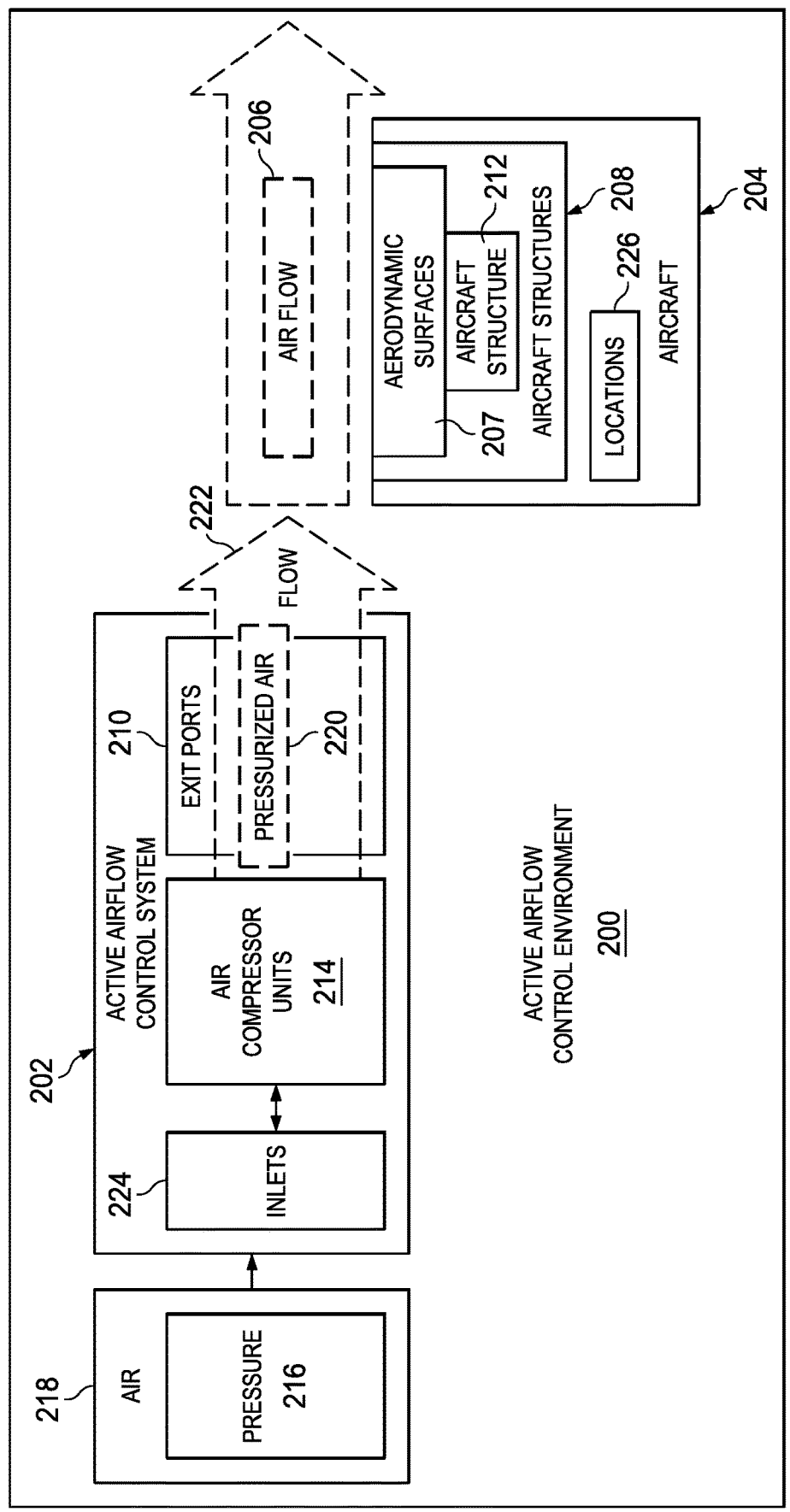
FIG. 2 is an illustration of a block diagram of an active airflow control environment in accordance with an illustrative embodiment.

With reference next to FIG. 2, an illustration of a block diagram of an active airflow control environment is depicted in accordance with an illustrative embodiment. As depicted, active airflow control environment 200 includes active airflow control system 202 for aircraft 204. In this illustrative example, vertical takeoff and landing aircraft 100 in FIG. 1 is one example of a physical implementation for aircraft 204 shown in block form in this figure. Another example of an implementation for aircraft 204 is an airplane, a rotorcraft, a commercial airplane, a military airplane, an unmanned aerial vehicle (UAV), a tilt rotor aircraft, or some other suitable type of aircraft.

As depicted, active airflow control system 202 operates to control airflow 206 aircraft and, in particular, over aircraft structures 208 for aircraft 204. For example, active airflow control system 202 controls airflow 206 over aerodynamic surfaces 207 on aircraft 204 and, in particular, over aerodynamic surface 207 on aircraft structures 208 for aircraft 204.

Aircraft structures 208 are selected from at least one of a wing, a horizontal stabilizer, a vertical stabilizer, a control surface, a rudder, a flap, a flap follower, an aileron, or some other suitable type of aircraft structure. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, active airflow control system 202 has a group of exit ports 210 in aircraft structure 212 within aircraft structures 208 for aircraft 204. As used herein, "a group of", when used with reference to items, means one or more items. For example, "a group of exit ports 210" is one or more of exit ports 210.

As depicted, active airflow control system 202 also has a group of air compressor units 214 in aircraft structure 212. The group of air compressor units 214 is connected to the group of exit ports 210. The group of air compressor units 214 increase pressure 216 of air 218 to form pressurized air 220 and sends flow 222 of pressurized air 220 through the group of exit ports 210. As depicted, pressurized air 220 flowing out of the group of exit ports 210 actively controls airflow 206 relative to aircraft structure 212 for aircraft 204, enabling improved performance of aircraft 204.

In the illustrative example, an air compressor unit in the group of air compressor units 214 may be implemented using various types of air compressor devices. The air compressor device selected for use in the group of air compressor units 214 is selected from a group of parameters, including at least one of pressure, mass flow, volume flow, airspeed, power use, weight, or other suitable parameters.

The parameters considered in the values for the parameters depend on the particular implementation. For example, an air compressor unit may have a requirement of 6 (PSI) and a mass flow of 67 lbs/min. Other parameters that may also be used to select their compressor unit also may include the amount of power used, as well as the weight and size of the air compressor unit. However, if the number of air compressor units is increased or decreased, these values also may change. The number of air compressor units used also may affect the maximum weight allowed for each air compressor unit.

As depicted, air 218 is received by active airflow control system 202 through a group of inlets 224 in active airflow control system 202. The group of inlets 224 is located in a group of locations 226 on aircraft 204 such that the group of inlets 224 actively controls airflow 206 relative to aircraft 204 when drawing air 218 during operation of active airflow control system 202. In this illustrative example, the active control of airflow 206 by the group of inlets 224 occurs when the group of inlets 224 draws air 218 into active airflow control system 202 for pressurization in a manner that affects airflow 206.

Thus, the illustrative example provides one or more technical solutions that overcome the technical problem with the complexity and weight of currently used active airflow control systems in aircraft. The group of air compressor units 214 in aircraft structure 212 for which are the control of airflow 206 is performed. When an additional aircraft structure in aircraft structures 208 are present for which the control of airflow 206 is performed, additional air compressor units may be located in the additional aircraft structures. Thus, active airflow control system 202 allows for a distributed placement of air compressor units 214. As a result, issues with at least one of a single air compressor in a fuselage of aircraft 204 or some other location supplying pressurized air is reduced or avoided.

Further, the group of inlets 224 is in the group of locations 226 selected to provide additional control of airflow 206 flowing over aerodynamic surfaces 207 on aircraft 204. This additional control of airflow 206 provided by the group of inlets 224, in addition to the group of exit ports 210, enables an improved performance of aircraft 204.

Figure 3:
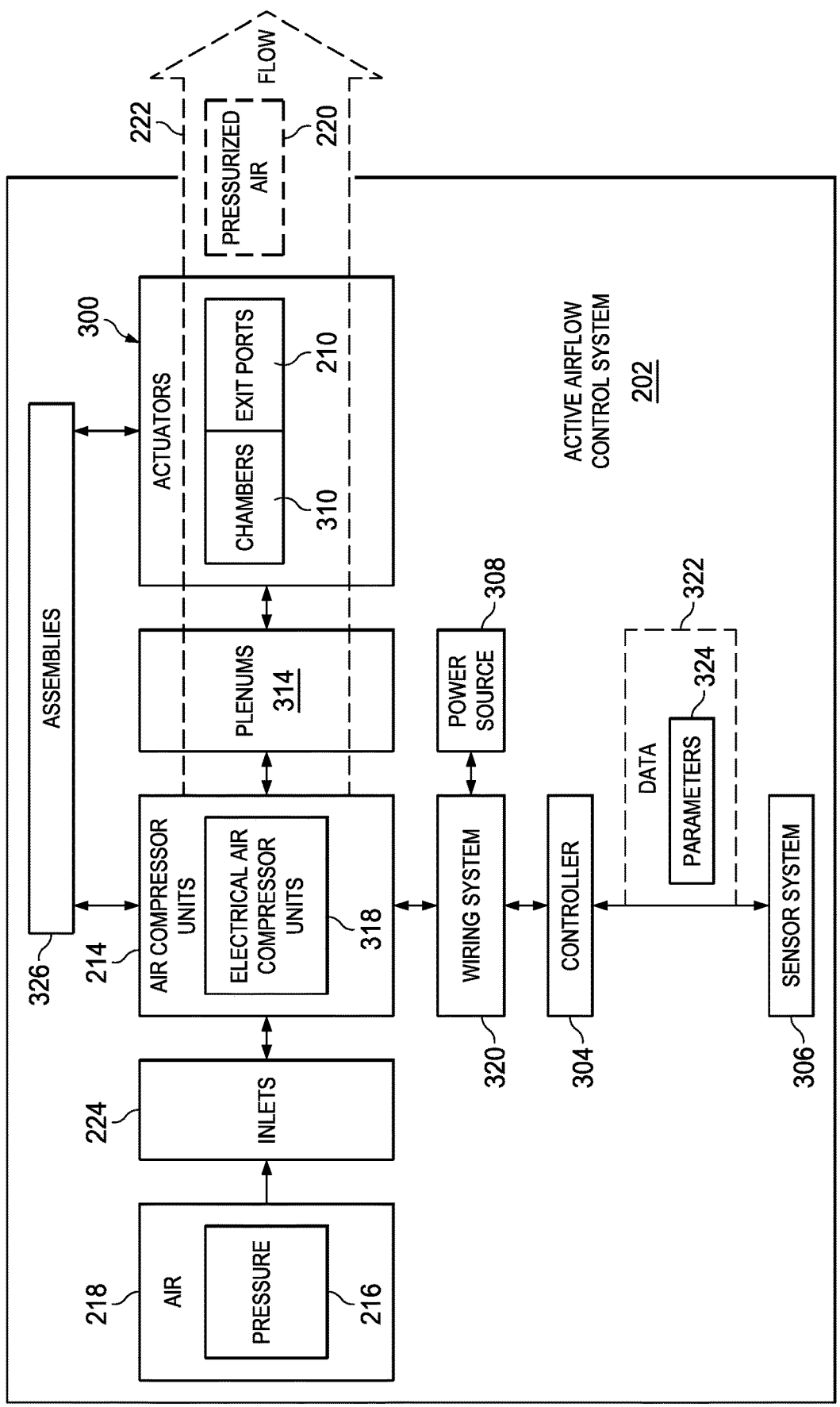
FIG. 3 is a more detailed illustration of a block diagram of an active airflow control system in accordance with an illustrative embodiment.

With reference next to FIG. 3, a more detailed illustration of a block diagram of an active airflow control system is depicted in accordance with an illustrative embodiment. A more detailed illustration of active airflow control system 202 in FIG. 2 is shown in this figure. In the illustrative examples, the same reference numeral may be used in more than one figure. This reuse of a reference numeral in different figures represents the same element in the different figures. The additional components shown in this figure are examples of other components that may be present in active airflow control system 202.

In this example, active airflow control system 202 includes a number of components in addition to a group of exit ports 210 and a group of air compressor units 214. As depicted, active airflow control system 202 also includes a group of actuators 300, a group of inlets 224, controller 304, sensor system 306, and power source 308.

The group of actuators 300 is connected to the group of air compressor units 214. An actuator in the group of actuators is a physical structure that contains the group of exit ports 210 and a group of chambers 310. The group of chambers 310 is connected to the group of exit ports 210 such that pressurized air 220 flows between the group of exit ports 210 and the group of chambers 310.

In this depicted example, the connection of the group of air compressor units 214 is an indirect connection through the group of chambers 310 in the group of actuators 300. As depicted, the group of chambers 310 in the group of actuators 300 is connected to the group of air compressor units 214 by a group of plenums 314.

The group of actuators 300 receives flow 222 of pressurized air 220 from the group of air compressor units 214 and controls flow 222 of pressurized air 220 out of the group of exit ports 210 in the group of actuators 300. In this illustrative example, pressurized air 220 flowing out of the group of exit ports 210 actively controls airflow 206 in FIG. 2 for aircraft 204 in FIG. 2, enabling improved performance of aircraft 204.

For example, pressurized air 220 flows through at least one of the group of chambers 310 or the group of exit ports 210 in a manner that shapes flow 222 of pressurized air 220 out of the group of exit ports 210. The configuration of at least one of the group of chambers 310 or the group of exit ports 210 shapes flow 222 of pressurized air 220.

For example, pressurized air 220 may flow out to the group of exit ports 210 in a desired direction and speed. Pressurized air 220 may flow out of the group of exit ports 210 to form vortexes depending on the configuration of at least one of the group of chambers 310 or the group of exit ports 210.

The group of inlets 224 is connected to the group of air compressor units 214, and the group of inlets 224 supplies air 218 to the group of air compressor units 214. In this illustrative example, the group of inlets 224 receives air 218 from the environment around aircraft 204 in FIG. 2. The suction of air 218 through the group of inlets 224 also controls airflow 206 over aerodynamic surfaces 207 on aircraft structures 208 in FIG. 2 and add to improved performance of aircraft 204.

The group of inlets 224 may be located in aircraft structure 212 in FIG. 2 or in another aircraft structure in aircraft structures 208 in FIG. 2. For example, the group of inlets 224 may be located in at least one of an aerodynamic surface on the aircraft structure, a top side of the aircraft structure, a bottom side of the aircraft structure, a leading edge of the aircraft structure, a trailing edge of the aircraft structure, an intersection between aircraft structures, or in some other suitable location.

In the illustrative example, power source 308 supplies electrical power to operate the group of air compressor units 214 when the group of air compressor units 214 is a group of electrical air compressor units 318. Wiring system 320 connects power source 308 and the group of electrical air compressor units 318 to each other.

Power source 308 generates electrical power for the group of electrical air compressor units 318 in which electrical power is transmitted over wiring system 320. Power source 308 may be at least one of an auxiliary power unit, a battery system, an energy harvesting system, or some other suitable source of electrical power.

As depicted, controller 304 is connected to the group of air compressor units 214 by wiring system 320 and controls the operation of the group of air compressor units 214. Controller 304 may control the operation of the group of air compressor units 214 using data 322 generated by sensor system 306.

In this illustrative example, sensor system 306 generates data 322 about a group of parameters 324 that affects airflow 206 in FIG. 2. The group of parameters 324 is selected from at least one of an environmental condition, an aircraft parameter, a position of a control surface, a flow separation, a pressure gradient, or some other suitable parameter.

The environmental condition may be, for example, a cross wind, a temperature, a pressure, or some other environmental condition. The aircraft parameter may be, for example, speed, engine thrust, an engine out condition, an altitude, a roll angle, a bank angle, a side slip angle, or some other suitable aircraft parameter.

In this illustrative example, some or all of the components in active airflow control system 202 may be placed into assemblies 326 for use in aircraft structures 208 in FIG. 2. For example, a first group of actuators 300, a first group of air compressor units 214, and a first group of inlets 316 may be in a first assembly in assemblies 326. A second group of actuators 300, a second group of air compressor units 214, and a second group of inlets 316 may be in a second assembly in assemblies 326. Controller 304 may be located remotely to assemblies 326 using wiring system 320.

Thus, with active airflow control system 202, performance of aircraft 204 in FIG. 2 may be increased. The increasing performance may be an increase of a desired airflow resulting from at least one of adding energy to a boundary layer for the aircraft structure, preventing a flow separation, redirecting the airflow, controlling a circulation of the airflow, changing a pressure distribution, or some other change. Obtaining a desired airflow may result in reduced drag, increased lift, improved fuel efficiency, reduced download, increased speed, reduced noise, or other suitable types of desired benefits for aircraft 204.

The illustration of active airflow control environment 200 and the different components in active airflow control environment 200 in FIGS. 2-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, active airflow control system 202 in FIG. 2-3 may be used in other types of vehicles in addition to or in place of aircraft 204 in FIG. 2. The vehicle may be selected from one of a surface ship, a submarine, a racecar, a truck, a train, an automobile, a bus, or other suitable types of vehicles. Further, active airflow control system 202 may be an active fluid control system for some vehicles, such as a surface ship, a submarine, or other types of vehicles through which fluid flow takes other forms other than air. For example, the fluid may be water or some other suitable type of fluid.

As another example, active airflow control system 202 may omit sensor system 306 in some illustrative examples. In yet another example, the group of inlets 224 may include an air filter. Further, the group of plenums 314 may be omitted from active airflow control system 202.

As yet another illustrative example, controller 304 also may control at least one of the group of exit ports 210 in FIG. 2 or the group of inlets 224. For example, valves or other mechanisms may be used to control how much pressurized air flows through the group of exit ports 210 or how much of air 218 flows into inlets 224. Additionally, controller 304 may control individual ones of the group of exit ports 210 and the group of inlets 224. The amount of air 218 flows into inlets 224 and the amount of pressurized air 220 exiting exit ports 210 may change with flight conditions. These flight conditions may include, for example, speed, control surface deflection angle, temperature, or other flight conditions. At least one of the amount of air 218 flows into inlets 224 or the amount of pressurized air 220 exiting exit ports 210 may be changed by changing the speed at which the group of air compressor units 214 operates. In some illustrative examples, the flow may be controlled using valves. The signals for controlling these components may be made using wiring system 320.

Further, the number of air compressor units 214 used may be varied with respect to the number of chambers 310. An air compressor unit may send pressurized air 220 through a varied number of chambers 310 depending on the design. This variation allows for flexibility to match the capabilities of a particular air compressor unit with desired pressure for pressurized air 220. Further, the number of air compressor units 214 used may be designed to provide flexibility in integrating assemblies 326 into aircraft structures 208 in FIG. 2. For example, the number of air compressor units 214 may be selected based on size, weight, or other factors when integrating active airflow control system 202 into aircraft 204 in FIG. 2.

Figure 4:
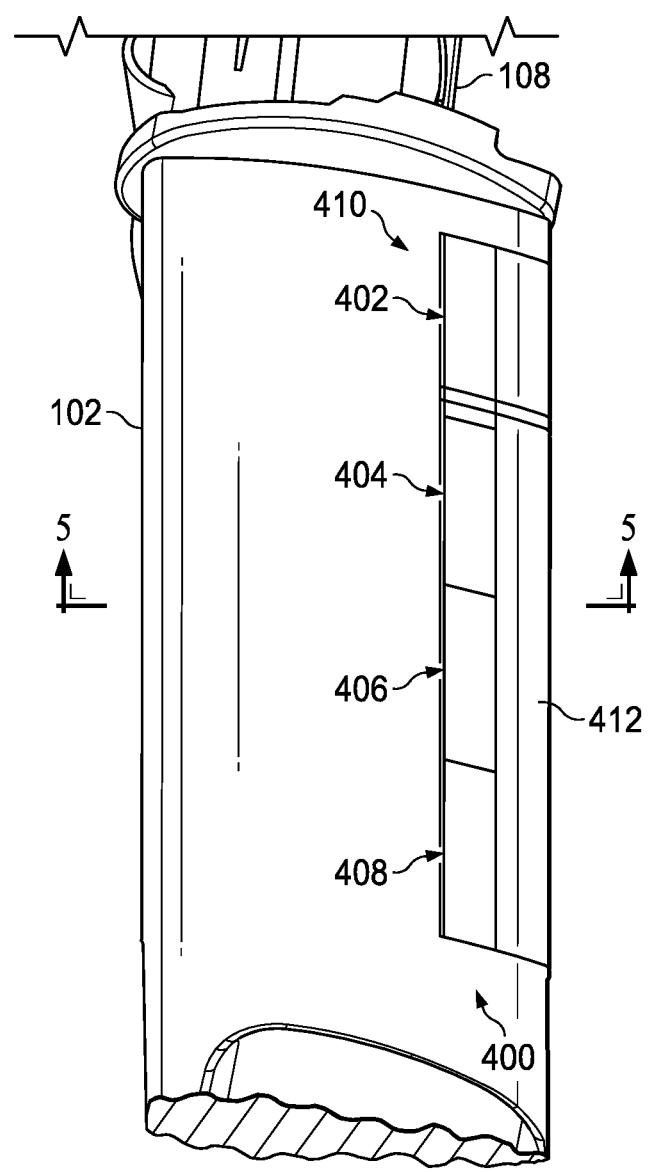
FIG. 4 is an illustration of a wing with an active airflow control system in accordance with an illustrative embodiment.

Turning to FIG. 4, an illustration of a wing with an active airflow control system is depicted in accordance with an illustrative embodiment. In this figure, a view of wing 102 for vertical takeoff and landing aircraft 100 in FIG. 1 is shown.

In this illustration, a portion of active airflow control system 400 is shown. Active airflow control system 400 is an example of one physical implementation for active airflow control system 202 shown in block form in FIG. 2.

In this illustrative example, active airflow control system 400 includes four assemblies, assembly 402 assembly 404, assembly 406, and assembly 408, as seen in this view of wing 102. These assemblies are associated with flap follower 410 for flap 412 on wing 102. A similar configuration of assemblies is present for active airflow control system 400 in wing 104 not shown in this view.

The use of active airflow control system 400 through assembly 402, assembly 404, assembly 406, and assembly 408 in wing 102 reduces download on wing 102 as caused by tilt rotor engine 108 in its current orientation for takeoff, landing, or hovering. With the use of active airflow control system 400, high-pressure air lines extending from fuselage 106 in FIG. 1 through wing 102 are unnecessary as compared to currently used active airflow control systems.

Figure 5:
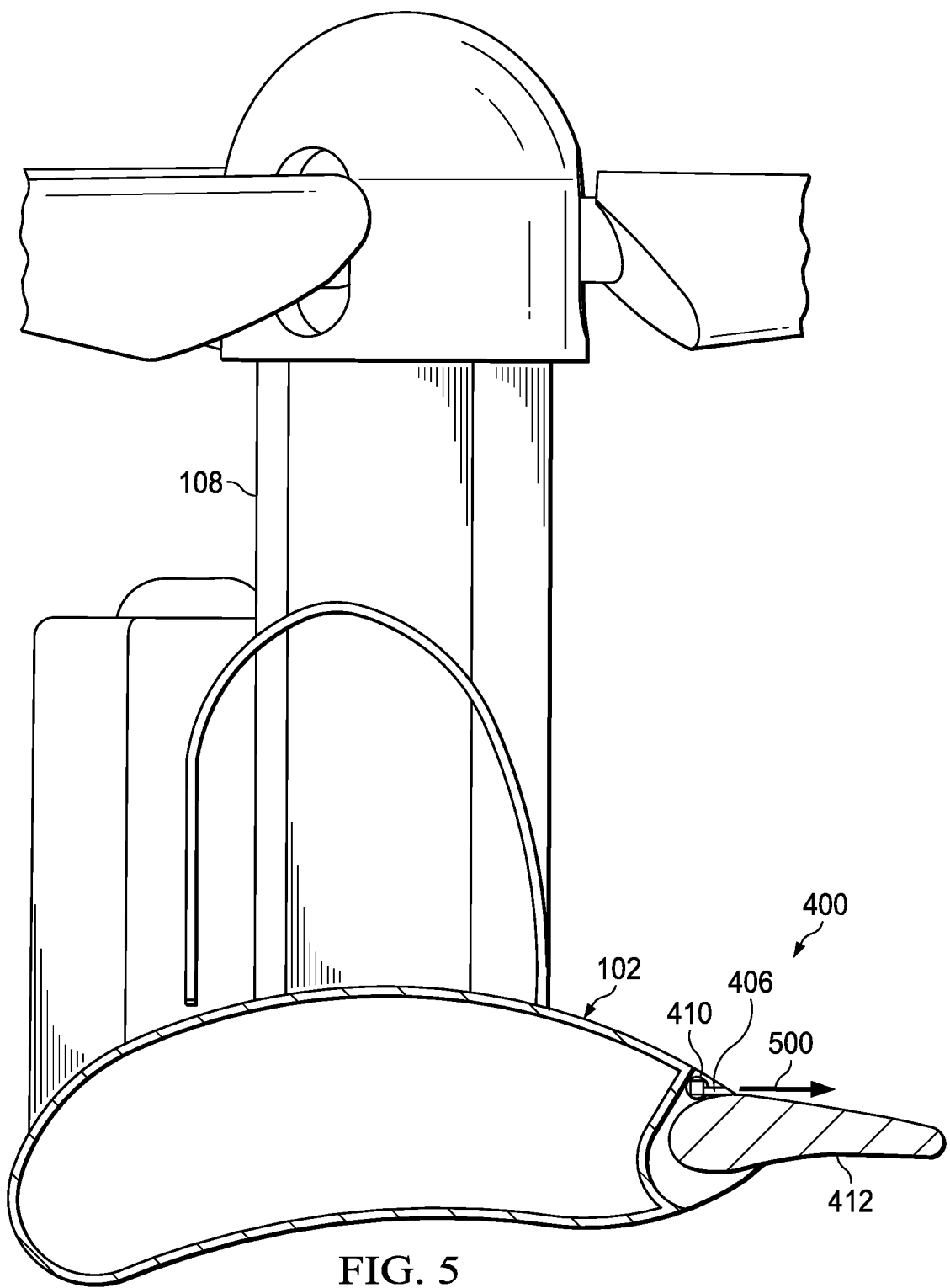
FIG. 5 is an illustration of a cross-section of a wing with an active airflow control system in accordance with an illustrative embodiment.

With reference to FIG. 5, an illustration of a cross-section of a wing with an active airflow control system is depicted in accordance with an illustrative embodiment. As depicted, a cross-sectional view of active airflow control system 400 for wing 102 is shown in a cross-section taken along lines 5-5 in FIG. 4. In particular, this cross-section shows assembly 406 in active airflow control system 400.

In this illustrative example, assembly 406 is associated with flap follower 410 on wing 102. By being associated with flap follower 410, assembly 406 may be connected, bolted, bonded, or, otherwise, attached to flap follower 410. Alternatively, assembly 406 may be associated with flap follower 410 by having one or more components in assembly 406 being formed as part of flap follower 410.

As depicted, assembly 406 helps reduce download on wing 102 when flap 412 is extended as shown for takeoff, landing, or hovering operations. In this illustrative example, assembly 406 directs pressurized air in the direction of arrow 500.

Figure 6:
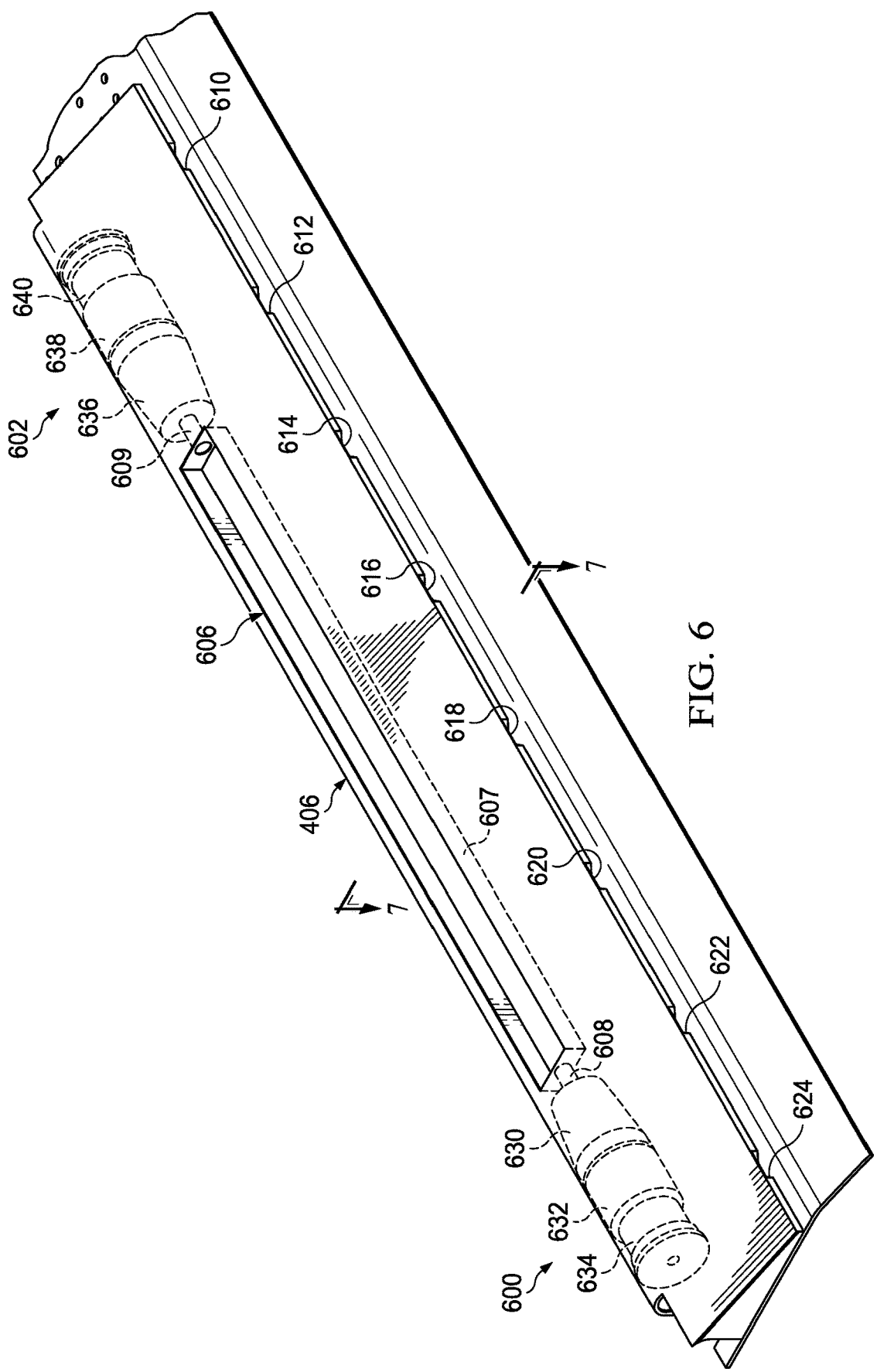
FIG. 6 is an illustration of an assembly for an active airflow control system in accordance with an illustrative embodiment.

With reference next to FIG. 6, an illustration of an assembly for an active airflow control system is depicted in accordance with an illustrative embodiment. A perspective view of assembly 406 is shown in this figure.

In this view, assembly 406 has a number of different components that are connected to each other. As depicted, assembly 406 includes air compressor unit 600, air compressor unit 602, and actuator 604. Air compressor unit 600 and air compressor unit 602 are connected to actuator 604.

Actuator 604 has inlet 606, which supplies air to air compressor unit 600 and air compressor unit 602. In this example, inlet 606 is an opening in the shape of a slot in the surface of wing 102. Inlet 606 is an opening to plenum 607 that is formed in actuator 604. Plenum 607 is connected to air filter 630 by channel 608 that is formed in actuator 604 and to air filter 636 by channel 609 formed in actuator 604. In some illustrative examples, air lines may be used in place of channel 608 and channel 609.

Air compressor unit 600 and air compressor unit 602 compress the air received through inlet 606 to form pressurized air and send the pressurized air through actuator 604. The pressurized air flows out of exit port 610, exit port 612, exit port 614, exit port 616, exit port 618, exit port 620, exit port 622, and exit port 624 in actuator 604 to actively control airflow. As depicted, air compressor unit 602 sends the pressurized air out through exit port 610, exit port 612, exit port 614, and exit port 616, while air compressor unit 600 sends pressurized air out through exit port 618, exit port 620, exit port 622, and exit port 624.

In this illustrative example, air compressor unit 600 includes air filter 630, electric motor 632, and compressor 634. Air compressor unit 602 includes air filter 636, electric motor 638, and compressor 640.

Figure 7:
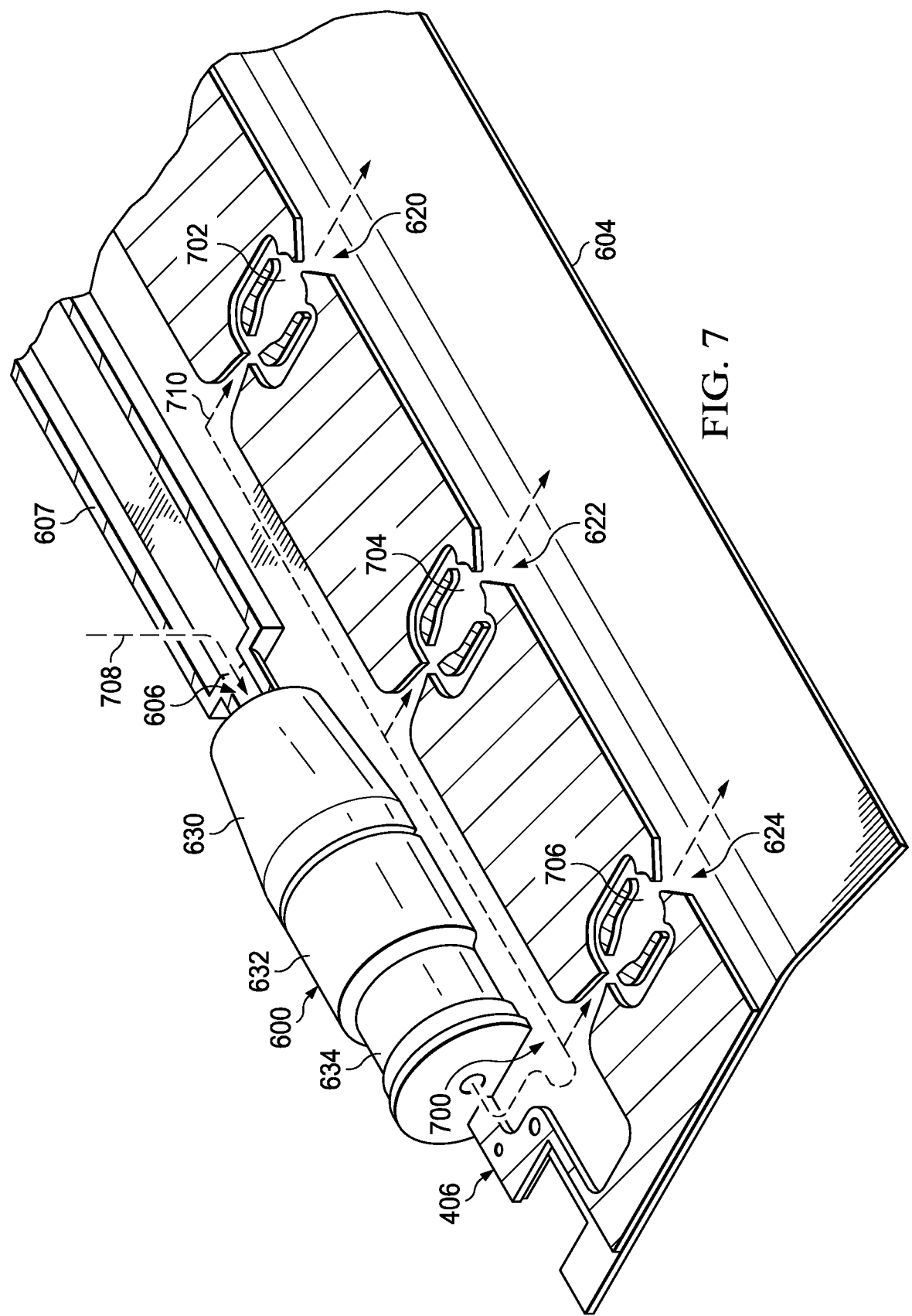
FIG. 7 is an illustration of a cross-sectional view of an active airflow control unit in accordance with an illustrative embodiment.

Turning now to FIG. 7, an illustration of a cross-sectional view of an active airflow control unit is depicted in accordance with an illustrative embodiment. In this figure, a perspective view of a cross-section of assembly 406 is shown in which the cross-section is taken along lines 7-7 in FIG. 6.

In this cross-sectional view, a portion of an interior of actuator 604 is shown. In this view, air compressor unit 600 is connected to plenum 700. Plenum 700 is connected to chamber 702, chamber 704, and chamber 706. Chamber 702 is connected to exit port 620; chamber 704 is connected to exit port 622; and chamber 706 is connected to exit port 624.

As depicted, air compressor unit 600 receives air through inlet 606 as shown by arrow 708. The air flows through air compressor unit 600, which compresses the air to form pressurized air. The pressurized air is sent through plenum 700 and flows through chamber 702, chamber 704, and chamber 706 to exit actuator 604 through exit port 620, exit port 622, and exit port 624, respectively. This flow of pressurized air is shown by arrow 710.

Figure 8:
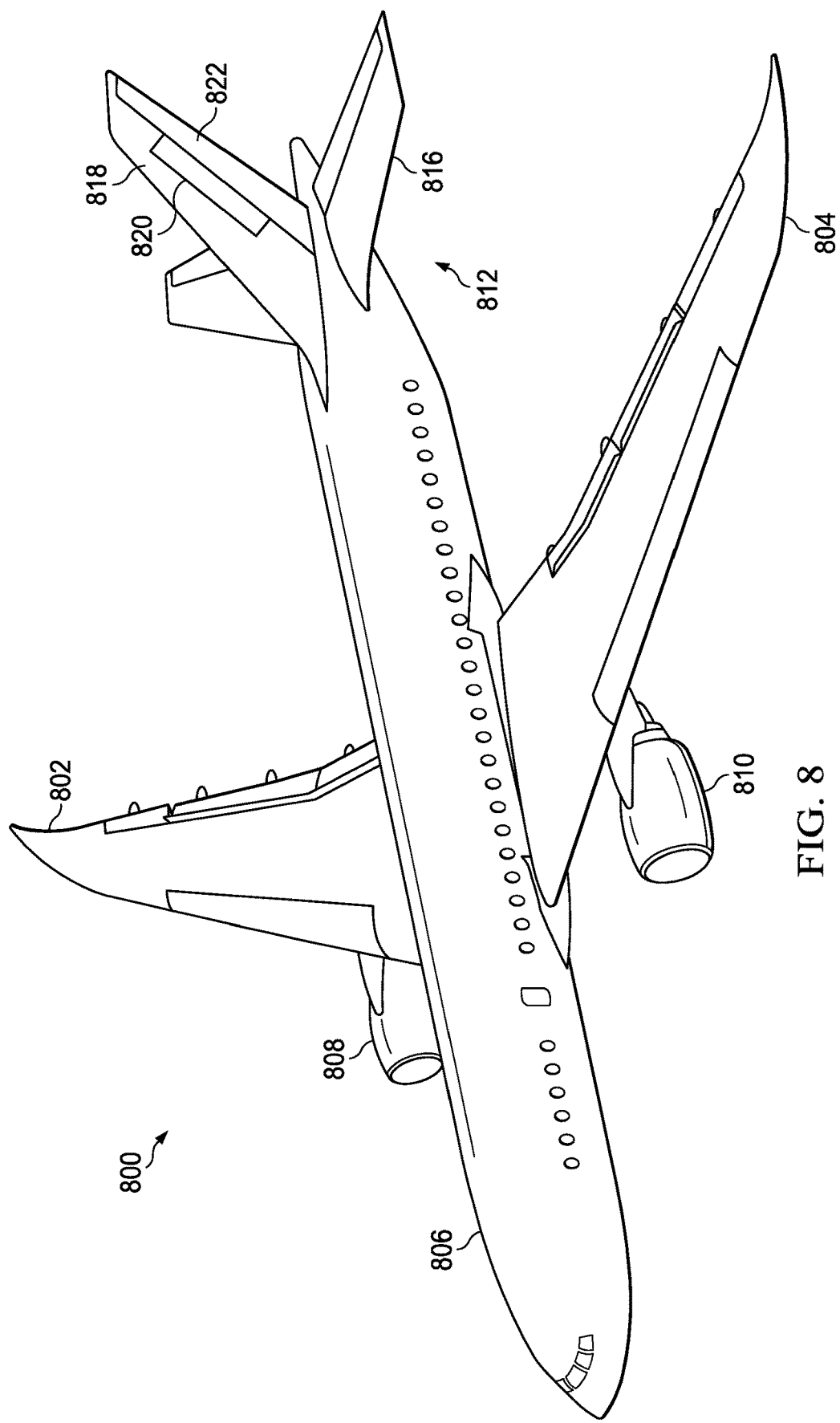
FIG. 8 is a pictorial illustration of a commercial airplane in accordance with an illustrative embodiment.

Turning to FIG. 8, a pictorial illustration of a commercial airplane is depicted in accordance with an illustrative embodiment. In this figure, commercial airplane 800 is an example of a physical implementation for aircraft 204 shown in block form in FIG. 2.

As depicted, commercial airplane 800 has wing 802 and wing 804 attached to fuselage 806. Commercial airplane 800 includes engine 808 attached to wing 802 and engine 810 attached to wing 804.

Fuselage 806 has tail section 812. Horizontal stabilizer 814, horizontal stabilizer 816, and vertical stabilizer 818 are attached to tail section 812 of fuselage 806.

Commercial airplane 800 is an example of an aircraft in which an active airflow control system may be implemented in accordance with an illustrative embodiment. For example, active airflow control system 820 is implemented in vertical stabilizer 818. Active airflow control system 820 operates to actively control airflow around rudder 822. This control of the airflow may improve performance in changing a yaw in a flight of commercial airplane 800.

In this illustrative example, active airflow control system 820 is depicted on one side of vertical stabilizer 818 in this figure, but is also located on the other side of vertical stabilizer 818. Active airflow control system includes assemblies that are associated with vertical stabilizer 818 that control the flow of air. This control may be, for example, controlling the size of a boundary layer around vertical stabilizer 818.

Figure 9:
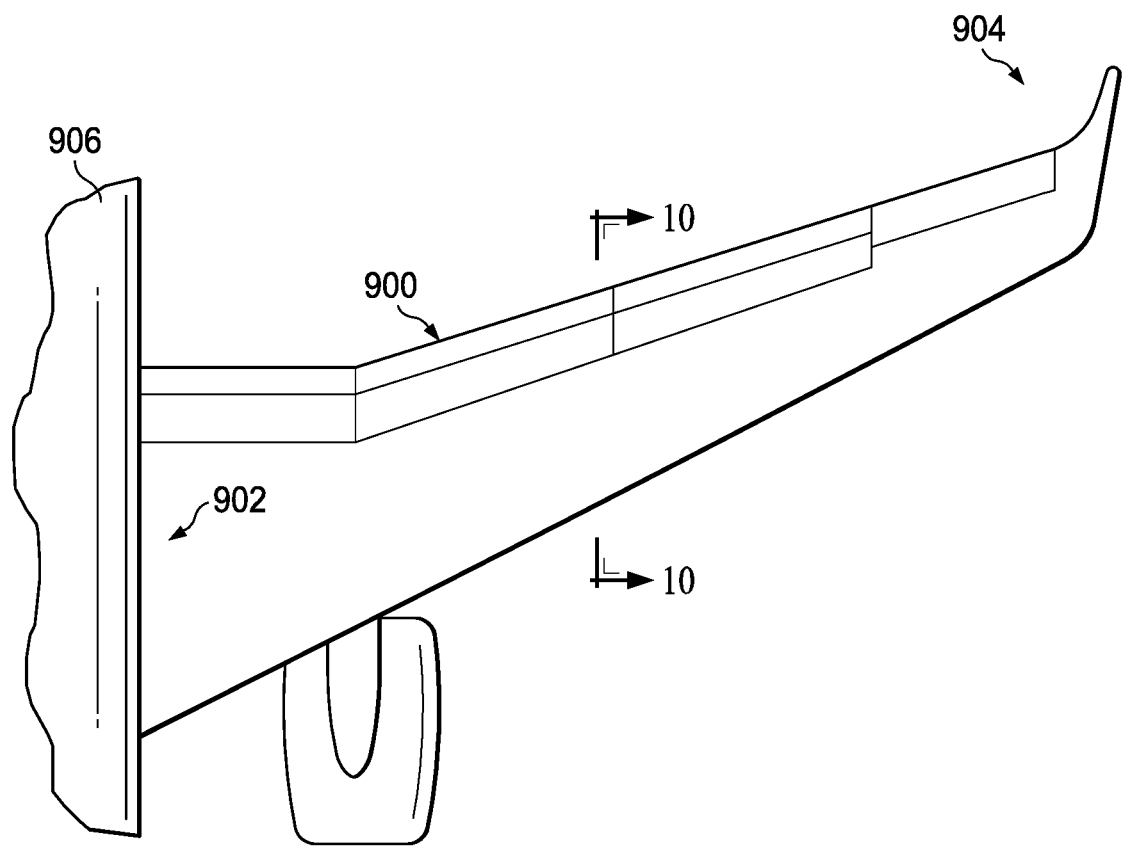
FIG. 9 is an illustration of locations for inlets in a wing in accordance with an illustrative embodiment.

Turning to FIG. 9, an illustration of locations for inlets in a wing is depicted in accordance with an illustrative embodiment. In this illustrative example, a top view of wing 900 is shown.

As depicted, a group of inlets may be located at locations in at least one of corner region 902 and tip region 904. Corner region 902 is a region at an intersection between wing 900 and fuselage 906. Placing inlets in locations in corner region 902 may be used to reduce corner vortexes that may form in corner region 902. Inlets that draw air in corner region 902 may weaken or remove corner vortexes.

Tip region 904 is a region at the tip of wing 900. The placement of the inlets in tip region 904 may reduce tip vortexes. Reducing the tip vortexes results in an improvement in span loading and a reduction in wing washout.

Figure 10:
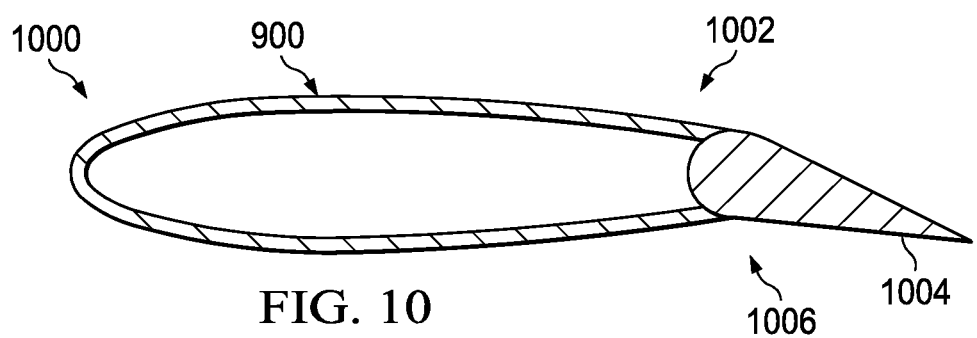
FIG. 10 is another illustration of locations for inlets in a wing in accordance with an illustrative embodiment.

Turning now to FIG. 10, another illustration of locations for inlets in a wing is depicted in accordance with an illustrative embodiment. A cross-sectional view of wing 900 is shown in a cross section taken along lines 10-10 in FIG. 9. In this view, inlets may be located at locations in at least one of leading edge region 1000, upstream region 1002, trailing edge tip region 1004, and flat intersection region 1006.

The placement of inlets in locations in leading edge region 1000 may reduce or prevent leading edge vortexes. The placement of the inlets in the locations within upstream region 1002 may remove or reduce a boundary layer. The inlets in locations within trailing edge tip region 1004 may enhance flow attachment from upstream locations. The inlets in locations within flat intersection region 1006 may remove or reduce corner vortexes.

Thus, the locations of the inlets are selected such that the group of inlets reduces undesired airflow. For example, the location of inlets may be selected to reduce or remove at least one of boundary layers, vortical structures, recirculating flow, or other undesirable conditions in the airflow.

FIGS. 11-14 show some example locations for inlets in wing 102 for vertical takeoff and landing aircraft 100 in FIG. 1. With reference first to FIG. 11, an illustration of a cross-section of a wing with an active airflow control system is depicted in accordance with an illustrative embodiment. As depicted, a cross-sectional view of active airflow control system 400 for wing 102 is shown in a cross-section taken along lines 5-5 in FIG. 4. This cross-section shows assembly 406 in active airflow control system 400.

In this illustrative example, wing 102 is shown in a cruise configuration. As depicted, inlet 1100 is shown on bottom side 1102 of assembly 406. With this configuration, airflow 1104 creates low-pressure region 1106 on bottom side 1108 of wing 102.

A portion of airflow 1104 streams through low-pressure region 1106 on bottom side 1108 of wing 102 into inlet 1100 as shown by arrow 1110. Compressed air flows out of assembly 406 as shown by arrow 1111.

With reference next to FIG. 12, another illustration of a cross-section of a wing with an active airflow control system is depicted in accordance with an illustrative embodiment. As depicted, a cross-sectional view of active airflow control system 400 for wing 102 is shown in a cross-section taken along lines 5-5 in FIG. 4. This cross-section shows assembly 406 in active airflow control system 400.

In this example, inlet 1200 is located on top side 1202 of assembly 406 rather than on bottom side 1102 of assembly 406. A portion of airflow 1104 streams through high-pressure region 1204 on top side 1206 of wing 102 into inlet 1200 in assembly 406 as shown by arrow 1208. Pressurized air flows out of assembly 406 as indicated by arrow 1210.

Figure 13:
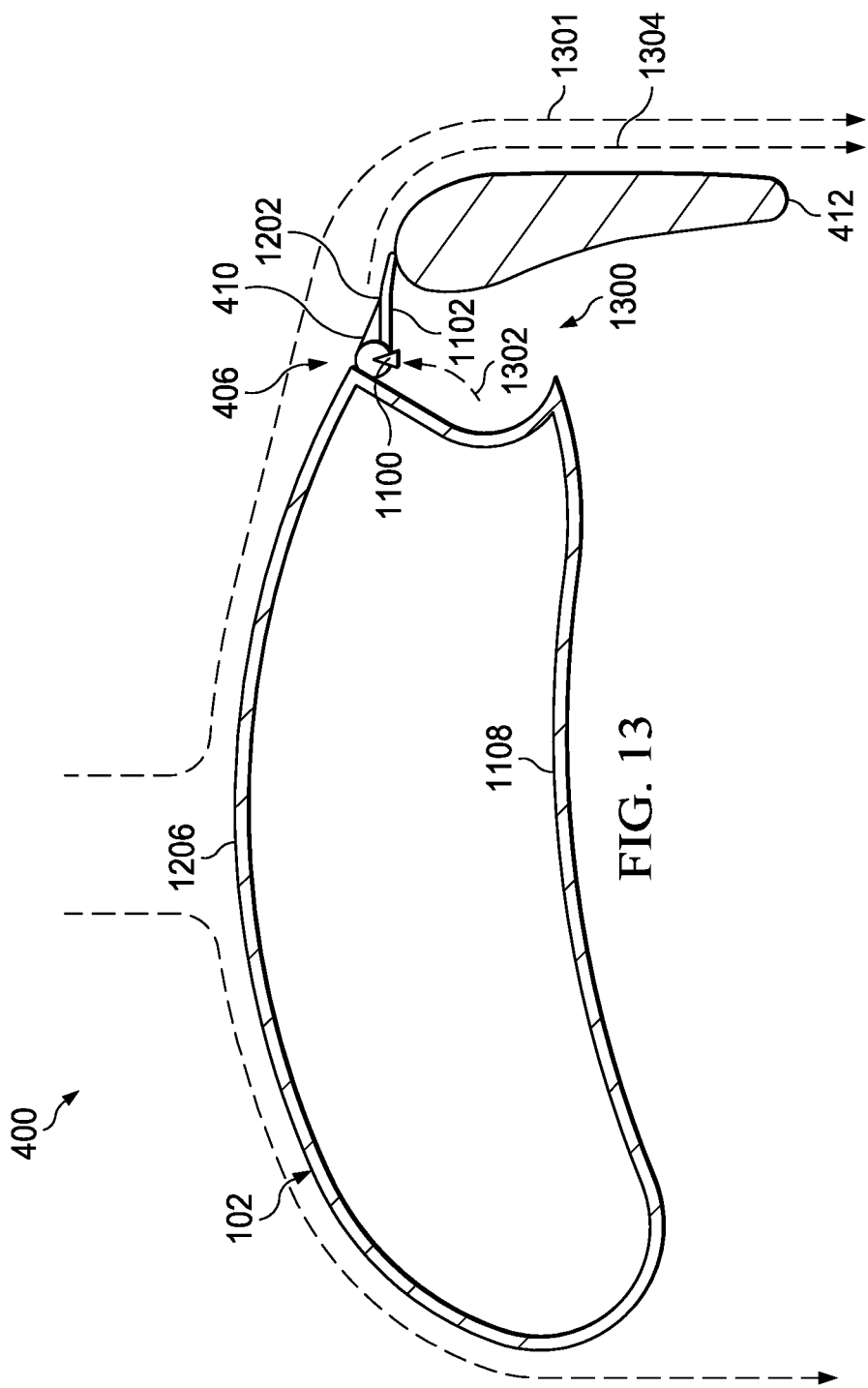
FIG. 13 is an illustration of a cross-section of a wing with an active airflow control system in accordance with an illustrative embodiment.

Turning to FIG. 13, an illustration of a cross-section of a wing with an active airflow control system is depicted in accordance with an illustrative embodiment. As depicted, a cross-sectional view of active airflow control system 400 for wing 102 is shown in a cross-section taken along lines 5-5 in FIG. 4. This cross-section shows assembly 406 in active airflow control system 400.

In this illustrative example, wing 102 is shown in a hover or takeoff configuration. As depicted, inlet 1100 is shown on bottom side 1102 of assembly 406. With this configuration of wing 102, airflow 1301 creates high-pressure region 1300 on bottom side 1108 of wing 102. A portion of airflow 1301 streams through high-pressure region 1300 into inlet 1100 as shown by arrow 1302. Pressurized air flows out of assembly 406 as shown by arrow 1304.

Figure 14:
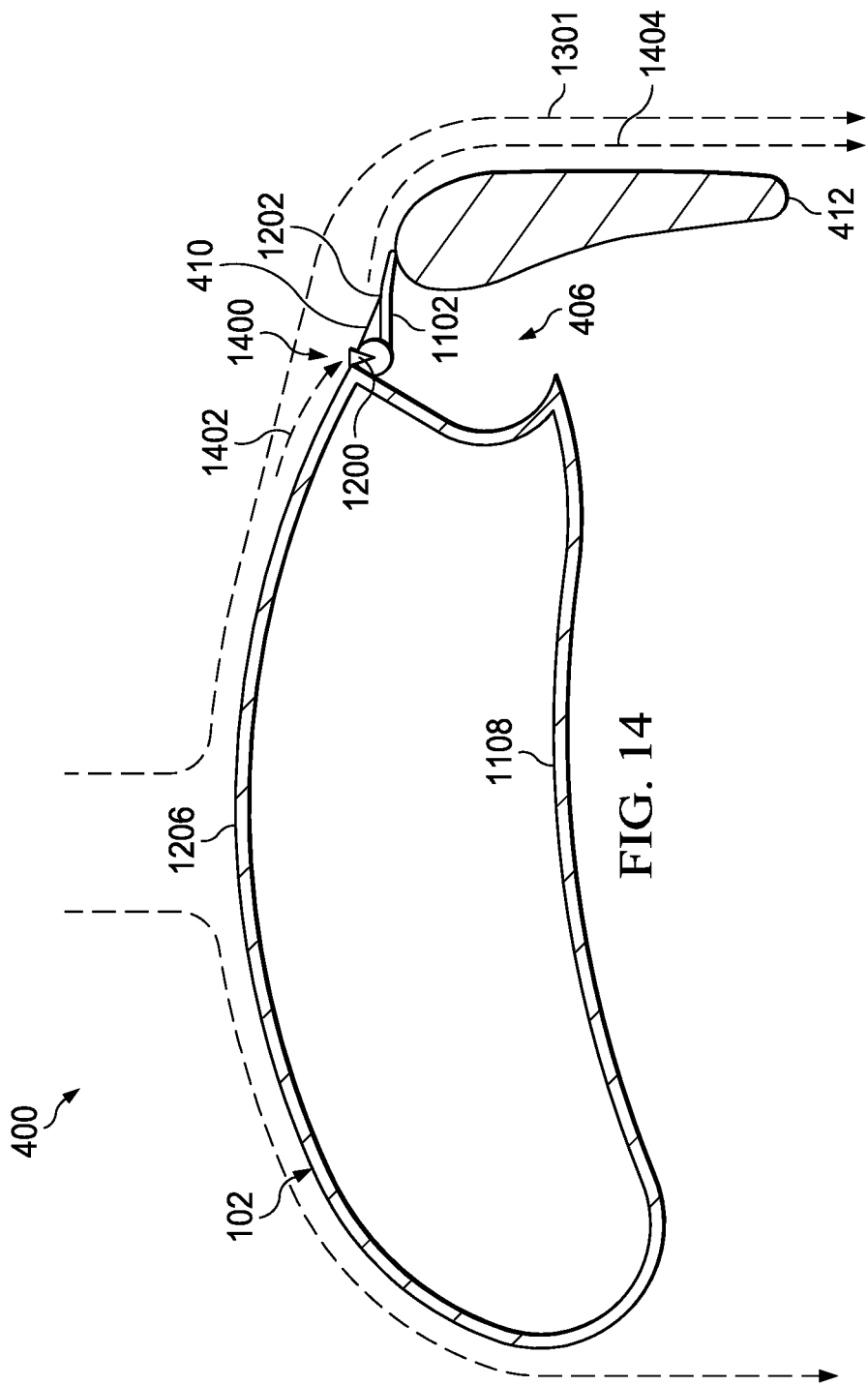
FIG. 14 is an illustration of a cross-section of a wing with an active airflow control system in accordance with an illustrative embodiment.

With reference now to FIG. 14, an illustration of a cross-section of a wing with an active airflow control system is depicted in accordance with an illustrative embodiment. As depicted, a cross-sectional view of active airflow control system 400 for wing 102 is shown in a cross-section taken along lines 5-5 in FIG. 4. This cross-section shows assembly 406 in active airflow control system 400.

In this illustrative example, wing 102 is shown in a hover or takeoff configuration. As depicted, inlet 1200 is shown on top side 1202 of assembly 406. With this configuration of wing 102, airflow 1301 creates low-pressure region 1400 on top side 1206 of wing 102. A portion of airflow 1301 streams through low-pressure region 1400 into inlet 1200 as shown by arrow 1402. The flow of air into inlet 1200 may pull on the boundary layer in low-pressure region 1400 to further improve the attachment of airflow 1301. Pressurized air flows out of assembly 406 as shown by arrow 1404.

The illustration of the locations for inlets for active airflow control system 400 in FIG. 4 in vertical takeoff and landing aircraft 100 in FIG. 1 are shown as illustrative examples of some locations that may be used and are not meant to limit the manner in which other illustrative examples may be implemented. The locations may be selected for the inlets to cause a reduction in undesired airflow, resulting in increased performance for vertical takeoff and landing aircraft 100.

Figure 15:
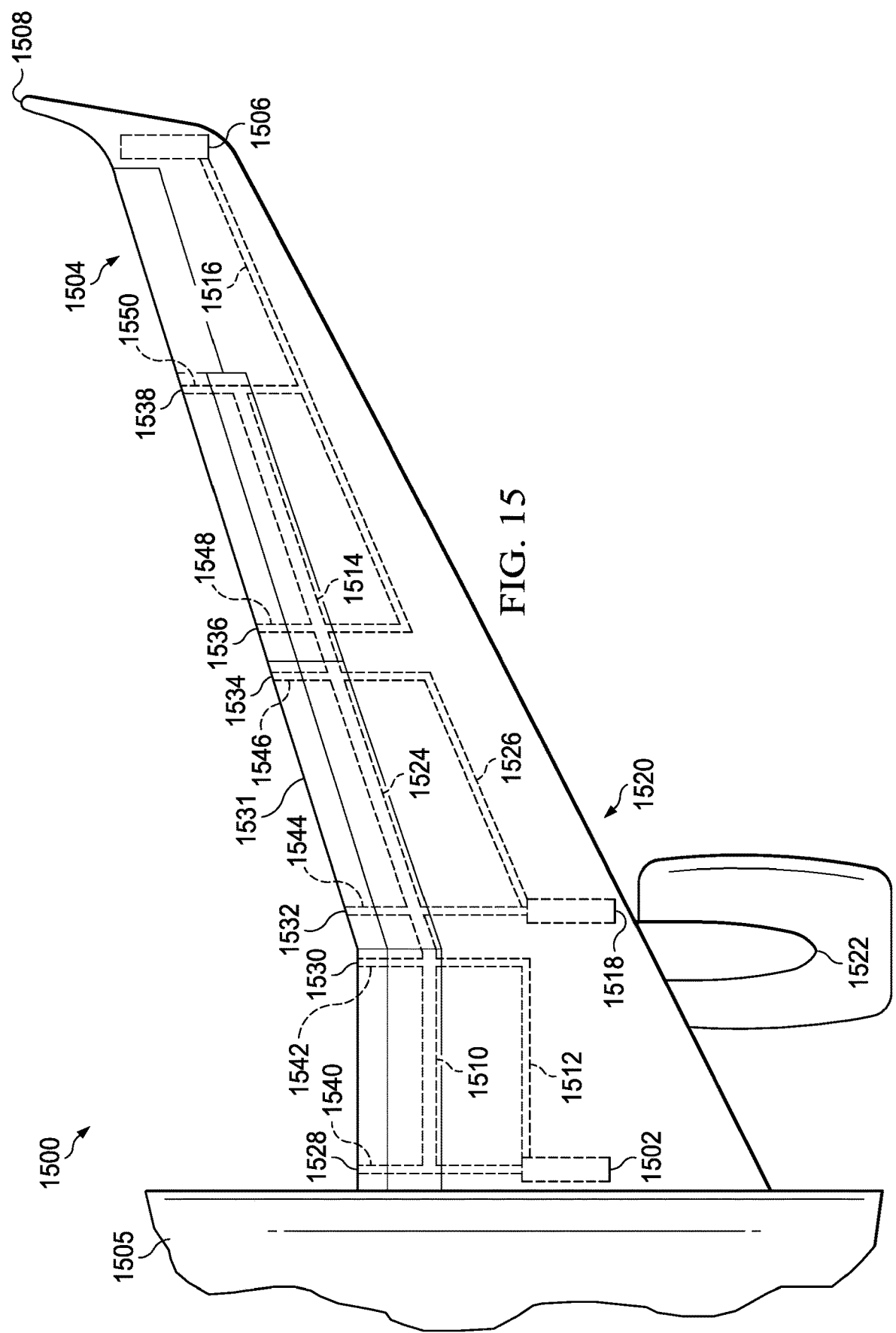
FIG. 15 is an illustration of locations for inlets in a wing in accordance with an illustrative embodiment.

With reference now to FIG. 15, an illustration of locations for inlets in a wing is depicted in accordance with an illustrative embodiment. In this illustrative example, a top view of wing 1500 is shown.

Inlet 1502 is shown in a location on upper surface 1504 of wing 1500 next to the intersection of wing 1500 and fuselage 1505. In this example, inlet 1502 takes the form of a slot. Inlet 1506 is shown in a location on upper surface 1504 at wingtip 1508 of wing 1502.

In this example, inlet 1502 is connected to assembly 1510 through air lines 1512. Inlet 1506 is connected to assembly 1514 through air lines 1516.

As another example, inlet 1518 is located on bottom side 1520 of wing 1500 and is shown in phantom next to the intersection between wing 1500 and nacelle 1522. As depicted, inlet 1518 supplies air to assembly 1524. Inlet 1518 is connected to assembly 1524 by air lines 1526.

Further, inlet 1528, inlet 1530, inlet 1532, inlet 1534, inlet 1536, and inlet 1538 are located at trailing edge 1531 of wing 1500. Air line 1540 connects inlet 1528 to assembly 1510, and air line 1542 connects inlet 1530 to assembly 1510. Air line 1544 connects inlet 1532 to assembly 1524, and air line 1546 connects inlet 1534 to assembly 1524. Air line 1548 connects inlet 1536 to assembly 1514, and air line 1550 connects inlet 1538 to assembly 1514.

In these illustrative examples, the air lines carry air at lower pressures as compared to currently used active airflow control systems. As a result, high-pressure lines are unnecessary. Further, with the length of these air lines being shorter as compared to currently used airlines with centralized compression, increased safety is present, as well as a reduction in maintenance.

Figure 16:
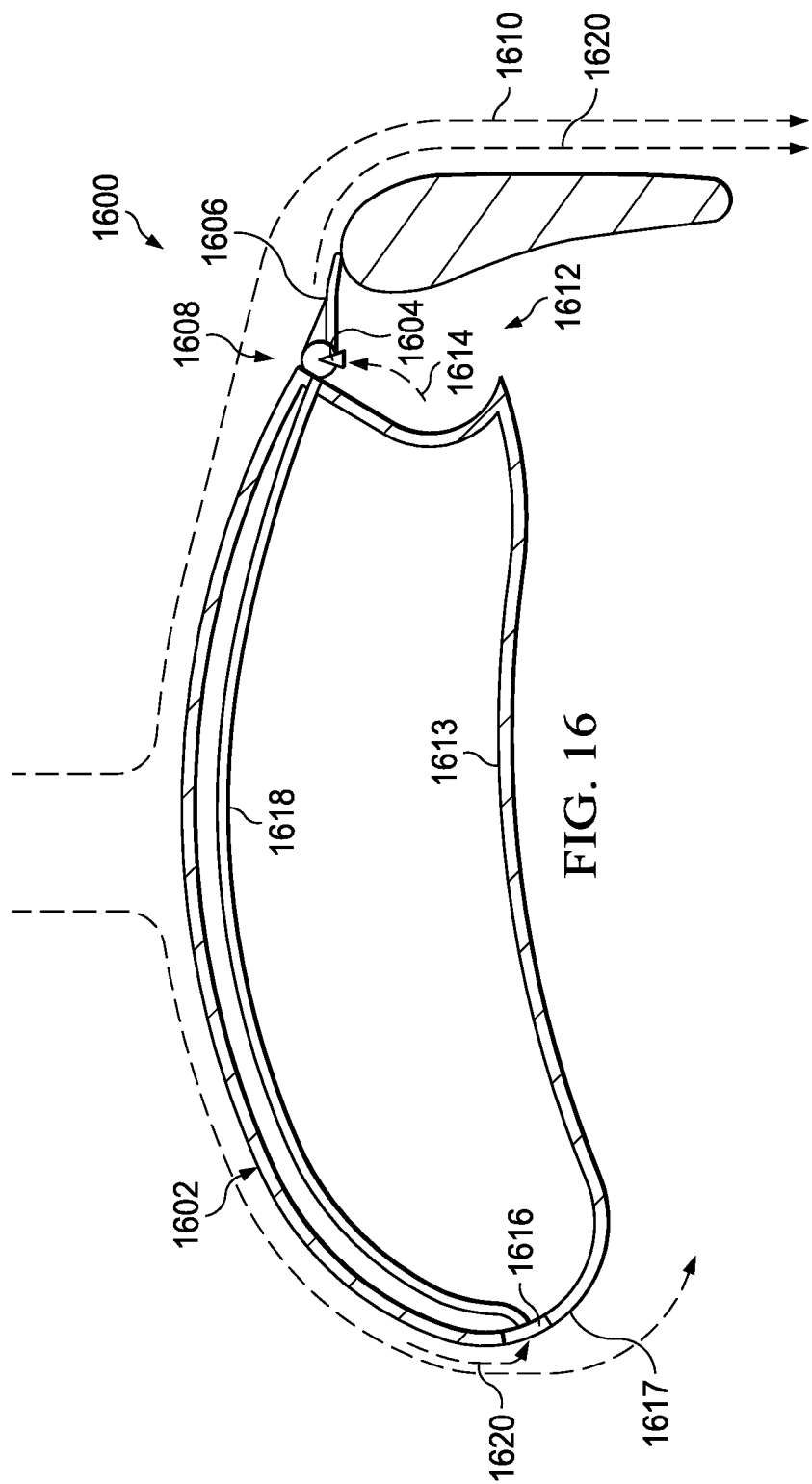
FIG. 16 is an illustration of a cross-section of a wing with an active airflow control system in accordance with an illustrative embodiment.

Turning to FIG. 16, an illustration of a cross-section of a wing with an active airflow control system is depicted in accordance with an illustrative embodiment. As depicted, a cross-sectional view of active airflow control system 1600 for wing 1602 is shown.

In this illustrative example, wing 1602 is shown in a hover or takeoff configuration. As depicted, inlet 1604 is shown on bottom side 1606 of assembly 1608. With this configuration of wing 1602, airflow 1610 creates high-pressure region 1612 on bottom side 1613 of wing 1600. A portion of airflow 1610 streams through high-pressure region 1612 into inlet 1604 as shown by arrow 1614.

Further, inlet 1616 is located at leading edge 1617 of wing 1602. Inlet 1616 is connected to assembly 1608 by air line 1618. Air is drawn into inlet 1616 as shown by arrow 1620. The air drawn into inlet 1616 may aid in reducing separation at leading edge 1617.

The air drawn by inlet 1604 and inlet 1616 is pressurized in assembly 1608. Pressurized air flows out of assembly 1608 as shown by arrow 1620.

The different illustrations of aircraft structures with components for active airflow control systems in FIGS. 5-16 are meant as illustrations of some physical implementations for active airflow control system 202 shown in block form in FIG. 2. These illustrations are not meant to limit the manner in which active airflow control system 202 may be implemented.

For example, inlets may be placed in other locations other than those shown in FIG. 9 and FIG. 10. For example, the inlets may be placed in locations within a region at intersections other than that shown in corner region 902. Other sections in which the inlets may be located include, for example, an intersection between an engine and a wing.

Further, although active airflow control system 202 is shown implemented in vertical takeoff and landing aircraft 100 in FIG. 1 and active airflow control system 820 is implemented in commercial airplane 800 in FIG. 8, active airflow control systems may be implemented in other types of aircraft or vehicles. As another illustrative example, an active airflow control system may be implemented to control airflow in other locations other than on a wing or a vertical stabilizer. For example, an active airflow control system may include exit ports on a fuselage, an engine housing, a fairing, or other suitable aircraft structures for which active control airflow is desirable.

Inlets may be in other locations other than being formed as part of an actuator, such as actuator 604 in FIG. 6. For example, the inlets may be in other locations with conduits, channels, air lines, or other types of air channel structures that connect the inlets to one or more air compressor units. For example, inlets may be located on the leading edge of the wing with the assemblies containing the other components being located at the flaps on the trailing edge of the wing.

In yet another illustrative example, chamber 702, chamber 704, and chamber 706 in FIG. 7 may each take the form of a channel rather than the configuration shown in FIG. 7. The particular configuration for chambers depends on the type of airflow of pressurized air desired.

Turning next to FIG. 17, an illustration of a flowchart of a process for controlling airflow is depicted in accordance with an illustrative embodiment. The process illustrated in the flowchart in FIG. 17 is implemented in active airflow control environment 200 in FIG. 2. For example, the process may be implemented in active airflow control system 202 to control airflow 206 for aircraft 204.

The process begins by drawing air through a group of inlets (operation 1700). The group of inlets is located in a group of locations on a vehicle such that the group of inlets actively controls an airflow relative to the aircraft when drawing the air.

The air drawn by the group of inlets is sent to a group of air compressor units (operation 1702). The process compresses the air in the group of air compressor units located in the aircraft structure to form pressurized air (operation 1704).

The pressurized air is sent through a group of exit ports in the aircraft structure (operation 1706) with the process terminating thereafter. The pressurized air flowing out of the group of exit ports actively controls the airflow for the aircraft, enabling improved performance of the aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, air may also be filtered before being sent to a group of air compressors. In yet another example, the air may be heated or cooled after being pressurized.

The illustrative embodiments of the disclosure may be described in the context of aircraft manufacturing and service method 1800 as shown in FIG. 18 and aircraft 1900 as shown in FIG. 19. Turning first to FIG. 18, an illustration of a block diagram of an aircraft manufacturing and service method is depicted in accordance with an illustrative embodiment. During pre-production, aircraft manufacturing and service method 1800 may include specification and design 1802 of aircraft 1900 and material procurement 1804.

During production, component and subassembly manufacturing 1806 and system integration 1808 of aircraft 1900 takes place. Thereafter, aircraft 1900 may go through certification and delivery 1810 in order to be placed in service 1812. While in service 1812 by a customer, aircraft 1900 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of a block diagram of an aircraft is depicted in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

In one illustrative example, components or subassemblies for an active airflow control system produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18.

One or more apparatus embodiments, method embodiments, or a combination thereof may be utilized while aircraft 1900 is in service 1812. For example, an active airflow control system may operate to control airflow of aircraft 1900 during flight while aircraft 1900 is in service 1812. The use of a number of the different illustrative embodiments may substantially expedite the assembly of aircraft 1900, reduce the cost of aircraft 1900, or both expedite the assembly of aircraft 1900 and reduce the cost of aircraft 1900.

As yet another example, one or more apparatus embodiments, method embodiments, or a combination thereof may be utilized during routine maintenance and service 1814. For example, a current flap follower may be replaced with a flap follower containing one or more assemblies for an active airflow control system, such as active airflow control system 202 shown in block form in FIG. 2 and illustrated using flap follower 410 in FIG. 4 with one or more assemblies for an active airflow control system. This replacement may be made during modification, reconfiguration, refurbishment, and other maintenance or service of aircraft 1900.

The active airflow control system in the different illustrative examples overcomes a technical issue with complexity, weight, and other undesirable factors in currently used active airflow control systems. In the different illustrative examples, air compressor units are used in aircraft structures instead of a centralized air compressor unit. With the air compressor units located in the aircraft structures, the technical issues with running high-pressure air lines through different aircraft structures to reach exit ports are avoided. In the illustrative examples, high-pressure air lines are not needed. This change of using lower pressure air lines results in at least one of reducing maintenance, increasing safety, or reducing weight. Additionally, inlets that provide air to the air compressor units may be located at or adjacent to the air compressor units. In this manner, air compressor units and auxiliary power units or bleed air from aircraft engines are unnecessary for actively controlling airflow for the aircraft.

Further, using lower pressure air lines increases safety and reliability of airflow control systems implemented in accordance with an illustrative embodiment. Further, with the ability to employ air compressor units as backups, an increase of reliability is present. Maintenance is also simplified with the reduction in the length or absence of a need for air lines in the airflow control system in the illustrative examples as compared to currently used airflow control systems.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:

a group of exit ports in a structure for a vehicle;

a group of compressor units located in the structure, wherein the group of compressor units is configured to increase a pressure of a fluid to form a pressurized fluid and is configured to send the pressurized fluid through the group of exit ports, wherein the pressurized fluid flowing out of the group of exit ports is configured to actively control a fluid flow relative to the structure for the vehicle;

a group of chambers connected to the group of compressor units and the group of exit ports, wherein the pressurized fluid flows through the group of chambers and wherein each chamber of the group of chambers is a fluidic oscillator configured to shape the pressurized flow out of the group of exit ports to form vortexes; and a group of inlets, wherein the group of inlets is connected to the group of compressor units and is configured to supply the fluid to the group of compressor units, wherein the group of inlets is located in a group of locations on the vehicle such that the group of inlets is configured to actively control the fluid flow relative to the structure for the vehicle when drawing the fluid, enabling an improved performance of the vehicle;

wherein the group of inlets, the group of compressor units, the group of chambers, and the group of exit ports comprise an assembly all contained within the structure; and wherein the vehicle is an aircraft and the structure is selected from one of a wing, a horizontal stabilizer, a vertical stabilizer, a control surface, a rudder, a flap, a flap follower, or an aileron.

2. The apparatus of claim 1 further comprising:
a sensor system that generates data about a group of parameters that affects the fluid flow; and
a controller connected to the group of compressor units, wherein the controller is configured to control an operation of the group of compressor units using the data generated by the sensor system.

3. The apparatus of claim 2, wherein the group of parameters is selected from at least one of an environmental condition, an aircraft parameter, a position of a control surface, a flow separation, or a pressure gradient.

4. The apparatus of claim 1, wherein the group of chambers is connected to the group of compressor units by a group of plenums.

5. The apparatus of claim 1, wherein the fluid is selected from at least one of air or water.

6. The apparatus of claim 1, wherein at least one chamber of the group of chambers comprises at least two diverters configured to form at least two fluid flow feedback paths and an interacting region that lead to a single exit port of the group of exit ports.

7. The apparatus of claim 1, wherein the group of compressor units is a group of electrical compressor units and further comprising:
a power source that generates electrical power for the group of electrical compressor units; and
a wiring system connecting the power source and the group of electrical compressor units to each other.

8. The apparatus of claim 1, wherein the group of locations for the group of inlets is selected such that at least one of weakening a vortex, enhancing a flow attachment, reducing a boundary layer, or reducing recirculating flow occur when the group of inlets draws the air.

9. The apparatus of claim 1, wherein the group of inlets is located in at least one of an aerodynamic surface on the structure, a top side of the structure, a bottom side of the structure, a leading edge of the structure, or a trailing edge of the structure.

10. The apparatus of claim 1, wherein the improved performance includes increasing a desired airflow resulting from at least one of adding energy to a boundary layer for the structure, preventing a flow separation, redirecting the airflow, controlling a circulation of the airflow, and changing a pressure distribution.

11. An active airflow control system comprising:
a group of exit ports in an aircraft; and
a group of air compressor units in an aircraft structure of the aircraft, wherein the group of air compressor units is configured to increase a pressure of air to form a pressurized air and is configured to send the pressurized air through the group of exit ports, wherein the pressurized air flowing out of the group of exit ports is configured to actively control an airflow relative to the aircraft;

a group of chambers connected to the group of air compressor units and the group of exit ports, wherein the pressurized air flows through the group of chambers and wherein each chamber of the group of chambers is a fluidic oscillator configured to shape the pressurized air out of the group of exit ports to form vortexes; and a group of inlets, wherein the group of inlets is configured to supply the air to the group of air compressor units and wherein the group of inlets is located in a group of locations on the aircraft such that the group of inlets is configured to actively control the airflow relative to the aircraft when drawing the air, enabling an improved performance of the aircraft;

wherein the group of inlets, the group of air compressor units, the group of chambers, and the group of exit ports comprise an assembly all contained within the aircraft structure;

wherein the aircraft structure is selected from one of a wing, a horizontal stabilizer, a vertical stabilizer, a control surface, a rudder, a flap, a flap follower, or an aileron.

12. The active airflow control system of claim 11 further comprising:
a controller connected to the group of air compressor units, wherein the controller is configured to control an operation of the group of air compressor units.

13. The active airflow control system of claim 12 further comprising:
a sensor system that generates data about a group of parameters that affects the airflow.

14. The active airflow control system of claim 13, wherein the group of parameters is selected from at least one of an environmental condition, an aircraft parameter, a position of a control surface, a flow separation, or a pressure gradient.

15. The active airflow control system of claim 11, wherein the group of air compressor units is a group of electrical air compressor units and further comprising:
a power source that generates electrical power for the group of electrical air compressor units; and
a wiring system connecting the power source and the group of electrical air compressor units to each other.

16. The active airflow control system of claim 11, wherein the group of chambers is connected to the group of air compressor units by a group of plenums.

17. The active airflow control system of claim 11, wherein the group of locations for the group of inlets is selected such that at least one of weakening a vortex, enhancing a flow attachment, reducing a boundary layer, or reducing recirculating flow occur when the group of inlets draws the air.

18. The active airflow control system of claim 11, wherein the group of inlets is located in at least one of an aerodynamic surface on the aircraft structure, a top side of the aircraft structure, a bottom side of the aircraft structure, a leading edge of the aircraft structure, or a trailing edge of the aircraft structure.

19. The active airflow control system of claim 11, wherein the improved performance includes increasing a desired airflow resulting from at least one of adding energy to a boundary layer for the aircraft structure, preventing a flow separation, redirecting the airflow, controlling a circulation of the airflow, and changing a pressure distribution.

20. The active airflow control system of claim 11, wherein the aircraft is selected from one of an airplane, a commercial airplane, a rotorcraft, a military airplane, an unmanned aerial vehicle, a vertical takeoff and landing aircraft, and a tilt rotor aircraft.

21. A method for controlling an airflow comprising:
drawing air through a group of inlets, wherein the group of inlets is located in a group of locations on an aircraft such that the group of inlets actively controls the airflow relative to the aircraft when drawing the air;
compressing the air drawn by the group of inlets in a group of air compressor units located in an aircraft structure to form pressurized air; and
sending the pressurized air through a group of chambers and a group of exit ports in the aircraft structure, wherein each chamber of the group of chambers is a fluidic oscillator that shapes a flow of the pressurized air out of the group of exit ports to form vortexes, wherein the pressurized air flowing out of the group of exit ports actively controls the airflow for the aircraft, enabling an improved performance of the aircraft, wherein the group of inlets, the group of air compressor units, the group of chambers, and the group of exit ports comprise an assembly all contained within the aircraft structure, and wherein the aircraft structure is selected from one of a wing, a horizontal stabilizer, a vertical stabilizer, a control surface, a rudder, a flap, a flap follower, or an aileron.

22. The method of claim 21 further comprising:
controlling a compression of the air to the pressurized air based on a group of parameters that affect the airflow.

23. The method of claim 21 further comprising:
receiving the air at a group of inlets in the aircraft structure; and
sending the air received at the group of inlets to the group of air compressor units.

* * * * *